(12) United States Patent
Boding et al.

(10) Patent No.: US 11,765,173 B2
(45) Date of Patent: *Sep. 19, 2023

(54) TECHNIQUES FOR REDUNDANT ACCESS RULE MANAGEMENT

(71) Applicant: VISA INTERNATIONAL SERVICE ASSOCIATION, San Francisco, CA (US)

(72) Inventors: Benjamin Scott Boding, Mountain View, CA (US); Christopher Holmes, Campbell, CA (US); Haochuan Zhou, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,624

(22) Filed: Mar. 31, 2022

(65) Prior Publication Data

US 2022/0232008 A1 Jul. 21, 2022

Related U.S. Application Data

(63) Continuation of application No. 17/084,492, filed on Oct. 29, 2020, now Pat. No. 11,323,448.

(51) Int. Cl.
*G06F 11/34* (2006.01)
*H04L 67/01* (2022.01)
*H04L 9/40* (2022.01)

(52) U.S. Cl.
CPC ........ *H04L 63/101* (2013.01); *G06F 11/3409* (2013.01); *H04L 63/0263* (2013.01); *H04L 63/0876* (2013.01); *H04L 67/01* (2022.05)

(58) Field of Classification Search
CPC .............. H04L 63/101; H04L 63/0263; H04L 63/0876; H04L 67/01; G06F 11/3409
See application file for complete search history.

(56) References Cited

U.S. PATENT DOCUMENTS 7,117,191 B2 10/2006 Gavan et al.
7,433,855 B2 * 10/2008 Gavan ................. H04L 41/0604
705/50

(Continued)

FOREIGN PATENT DOCUMENTS

JP 2009187143 8/2009
JP 2014064096 4/2014

(Continued)

OTHER PUBLICATIONS

U.S. Appl. No. 16/911,277, filed Jun. 24, 2020, 54 pages.

(Continued)

*Primary Examiner* — Minh Chau Nguyen
(74) *Attorney, Agent, or Firm* — Kilpatrick Townsend & Stockton LLP

(57) ABSTRACT

Techniques for managing redundant or overlapping access rules are provided. Access rules are determined for evaluation. Performance metrics for the access rules prior to implementation and post implementation are determined. Overlapping access rules are identified. Performance of the overlapping access rules are evaluated to determine actions to be applied to the overlapping access rules. Recommended actions and adjustments can be automatically provided by the system based on the performance analysis.

20 Claims, 30 Drawing Sheets

(56) References Cited

U.S. PATENT DOCUMENTS

| | | | |
|---|---|---|---|
| 7,527,195 | B2 | 5/2009 | Keithley et al. |
| 8,645,250 | B2 | 2/2014 | Boding |
| 2008/0162202 | A1 | 7/2008 | Khanna et al. |
| 2010/0138345 | A1 | 6/2010 | Lekhtman et al. |
| 2010/0199346 | A1 | 8/2010 | Ling et al. |
| 2011/0016052 | A1* | 1/2011 | Scragg ............ G06Q 20/02 705/44 |
| 2013/0218758 | A1 | 8/2013 | Koenigsbrueck et al. |
| 2014/0244840 | A1 | 8/2014 | Sweeney et al. |
| 2015/0026786 | A1* | 1/2015 | Alexander ......... H04W 12/128 726/7 |
| 2018/0288098 | A1 | 10/2018 | Wang et al. |

FOREIGN PATENT DOCUMENTS

| | | |
|---|---|---|
| KR | 20090131114 | 12/2009 |
| KR | 20100066962 | 6/2010 |

OTHER PUBLICATIONS

Application No. PCT/US2012/052893, International Search Report and Written Opinion, dated Feb. 26, 2013, 11 pages.
Application No. PCT/US2021/045927, International Search Report and Written Opinion, dated Nov. 10, 2021, 8 pages.

\* cited by examiner

| request_id | R1_68 | R1_52 | ... | R1_43 | R3_1597 | R3_1607 | ... | R3_1617 | R3_616 | R3_918 |
|---|---|---|---|---|---|---|---|---|---|---|
| 4344380774325000000001334 | 0 | 1 | ... | 0 | 0 | 0 | ... | 0 | 0 | 0 |
| 4344382246865000000001391 | 0 | 1 | ... | 0 | 0 | 0 | ... | 0 | 0 | 0 |
| 4344384248535000000001351 | 0 | 0 | ... | 0 | 0 | 0 | ... | 1 | 0 | 0 |
| 4344389057385000000001303 | 0 | 0 | ... | 0 | 0 | 0 | ... | 1 | 0 | 0 |
| 4344390212495000000001364 | 0 | 0 | ... | 0 | 0 | 0 | ... | 0 | 0 | 0 |
| 4344390842145000000001807 | 0 | 0 | ... | 0 | 1 | 0 | ... | 1 | 0 | 0 |
| 4344392530950000000001361 | 0 | 0 | ... | 0 | 1 | 0 | ... | 0 | 0 | 0 |
| 4344392560650000000001354 | 0 | 0 | ... | 0 | 0 | 0 | ... | 1 | 0 | 0 |
| 4344393972615000000001305 | 0 | 0 | ... | 0 | 1 | 0 | ... | 0 | 0 | 0 |
| 4344396852505000000001352 | 0 | 0 | ... | 0 | 1 | 0 | ... | 0 | 0 | 0 |
| 4344397737235000000001377 | 0 | 0 | ... | 0 | 0 | 0 | ... | 0 | 0 | 0 |
| 4344398596665000000001314 | 0 | 0 | ... | 0 | 1 | 0 | ... | 0 | 0 | 0 |
| 4344401720625000000001393 | 0 | 0 | ... | 0 | 0 | 0 | ... | 0 | 0 | 0 |
| 4344402339050000000001326 | 0 | 0 | ... | 0 | 1 | 0 | ... | 0 | 0 | 0 |
| 4344402532415000000001353 | 0 | 1 | ... | 0 | 0 | 0 | ... | 0 | 0 | 0 |

| Tranx_ID | TRTPC | Rule_1 | Rule_2 | Rule_3 | Rule_4 | Rule_5 | Rule_6 | Rule_7 | Rule_8 | Rule_9 | Rule_10 | Rule_11 | Rule_12 | Rule_13 | Rule_14 | Rule_15 |
|---|---|---|---|---|---|---|---|---|---|---|---|---|---|---|---|---|
| t1 | 1 | 0 | 0 | 0 | 0 | 0 | 0 | 0 | 0 | 0 | 0 | 0 | 0 | 0 | 1 | 1 |
| t2 | 1 | 0 | 0 | 0 | 0 | 0 | 0 | 0 | 0 | 0 | 0 | 0 | 0 | 0 | 1 | 0 |
| t3 | 1 | 0 | 0 | 0 | 0 | 0 | 0 | 0 | 0 | 0 | 0 | 0 | 0 | 0 | 1 | 0 |
| t4 | 1 | 0 | 0 | 0 | 0 | 0 | 0 | 0 | 0 | 0 | 0 | 0 | 0 | 0 | 1 | 1 |
| t5 | 1 | 0 | 0 | 0 | 0 | 0 | 0 | 0 | 0 | 0 | 0 | 0 | 0 | 0 | 1 | 1 |
| t6 | 1 | 0 | 0 | 0 | 0 | 0 | 0 | 0 | 0 | 0 | 0 | 0 | 0 | 0 | 1 | 0 |
| t7 | 1 | 0 | 0 | 0 | 0 | 0 | 0 | 0 | 0 | 0 | 0 | 0 | 0 | 0 | 1 | 1 |
| t8 | 2 | 0 | 0 | 0 | 1 | 0 | 0 | 0 | 0 | 0 | 0 | 0 | 0 | 0 | 0 | 0 |
| t9 | 2 | 0 | 0 | 0 | 1 | 0 | 1 | 0 | 0 | 0 | 0 | 0 | 0 | 0 | 0 | 0 |
| t10 | 2 | 0 | 0 | 0 | 0 | 0 | 0 | 1 | 0 | 0 | 0 | 0 | 0 | 0 | 0 | 0 |
| t11 | 2 | 0 | 0 | 0 | 0 | 0 | 0 | 1 | 0 | 0 | 0 | 0 | 0 | 0 | 0 | 0 |
| t12 | 2 | 0 | 0 | 0 | 1 | 0 | 0 | 0 | 0 | 0 | 0 | 0 | 0 | 0 | 0 | 0 |
| t13 | 2 | 0 | 0 | 0 | 0 | 0 | 1 | 0 | 0 | 0 | 0 | 0 | 0 | 0 | 0 | 0 |
| t14 | 2 | 0 | 0 | 0 | 1 | 0 | 0 | 0 | 0 | 0 | 0 | 0 | 0 | 0 | 0 | 0 |
| t15 | 3 | 0 | 0 | 0 | 0 | 1 | 0 | 0 | 0 | 0 | 0 | 0 | 0 | 0 | 0 | 0 |
| t16 | 3 | 0 | 0 | 0 | 0 | 1 | 0 | 0 | 0 | 0 | 0 | 0 | 0 | 0 | 0 | 0 |
| t17 | 3 | 0 | 0 | 0 | 0 | 0 | 0 | 0 | 1 | 0 | 0 | 0 | 0 | 0 | 0 | 0 |
| t18 | 3 | 0 | 1 | 0 | 0 | 0 | 0 | 0 | 0 | 0 | 0 | 0 | 0 | 0 | 0 | 0 |
| t19 | 3 | 0 | 0 | 0 | 0 | 1 | 0 | 0 | 0 | 0 | 0 | 0 | 0 | 0 | 0 | 0 |
| t20 | 3 | 1 | 0 | 0 | 0 | 0 | 0 | 0 | 0 | 0 | 0 | 0 | 0 | 0 | 0 | 0 |
| t21 | 3 | 0 | 0 | 0 | 0 | 1 | 0 | 0 | 0 | 0 | 0 | 0 | 0 | 0 | 0 | 0 |
| t22 | 4 | 0 | 0 | 0 | 0 | 0 | 0 | 0 | 0 | 1 | 0 | 0 | 0 | 0 | 0 | 0 |
| t23 | 4 | 0 | 0 | 0 | 0 | 0 | 0 | 0 | 0 | 1 | 0 | 0 | 0 | 0 | 0 | 0 |
| t24 | 4 | 0 | 0 | 0 | 0 | 0 | 0 | 0 | 0 | 1 | 0 | 0 | 0 | 0 | 0 | 0 |
| t25 | 4 | 0 | 0 | 0 | 0 | 0 | 0 | 0 | 0 | 1 | 0 | 0 | 0 | 0 | 0 | 0 |
| t26 | 4 | 0 | 0 | 0 | 0 | 0 | 0 | 0 | 0 | 1 | 0 | 0 | 0 | 0 | 0 | 0 |
| t27 | 4 | 0 | 0 | 0 | 0 | 0 | 0 | 0 | 0 | 1 | 0 | 0 | 0 | 0 | 0 | 0 |
| t28 | 4 | 0 | 0 | 0 | 1 | 0 | 0 | 0 | 0 | 0 | 0 | 0 | 0 | 0 | 0 | 0 |
| t29 | 5 | 0 | 0 | 1 | 0 | 0 | 1 | 0 | 0 | 0 | 1 | 0 | 0 | 0 | 0 | 0 |
| t30 | 5 | 0 | 0 | 0 | 0 | 0 | 0 | 0 | 0 | 0 | 1 | 1 | 0 | 0 | 0 | 0 |
| t31 | 5 | 0 | 0 | 0 | 0 | 0 | 0 | 0 | 0 | 0 | 1 | 0 | 0 | 0 | 0 | 0 |
| t32 | 5 | 0 | 0 | 0 | 0 | 0 | 0 | 0 | 0 | 0 | 1 | 0 | 0 | 0 | 0 | 0 |
| t33 | 5 | 0 | 0 | 1 | 0 | 0 | 1 | 0 | 1 | 0 | 1 | 0 | 0 | 0 | 0 | 0 |
| t34 | 5 | 0 | 0 | 0 | 0 | 0 | 0 | 0 | 0 | 0 | 1 | 1 | 0 | 0 | 0 | 0 |
| t35 | 5 | 0 | 0 | 1 | 0 | 0 | 0 | 0 | 0 | 0 | 1 | 0 | 0 | 0 | 0 | 0 |
| t36 | 6 | 0 | 0 | 0 | 0 | 0 | 0 | 0 | 0 | 0 | 0 | 0 | 0 | 1 | 0 | 0 |
| t37 | 6 | 0 | 0 | 0 | 0 | 0 | 0 | 0 | 0 | 0 | 0 | 0 | 0 | 1 | 0 | 0 |
| t38 | 6 | 0 | 0 | 0 | 0 | 0 | 0 | 0 | 0 | 0 | 0 | 0 | 0 | 1 | 0 | 0 |
| t39 | 6 | 0 | 0 | 0 | 0 | 0 | 0 | 0 | 0 | 0 | 0 | 0 | 0 | 1 | 0 | 0 |
| t40 | 6 | 0 | 0 | 0 | 0 | 0 | 0 | 0 | 0 | 0 | 0 | 0 | 0 | 1 | 0 | 0 |
| t41 | 6 | 0 | 0 | 0 | 0 | 0 | 0 | 0 | 0 | 0 | 0 | 0 | 0 | 1 | 0 | 0 |
| t42 | 6 | 0 | 0 | 0 | 0 | 0 | 0 | 0 | 0 | 0 | 0 | 0 | 0 | 1 | 0 | 0 |
| t43 | | | | | | | | | | | | | | | | |
| t44 | | | | | | | | | | | | | | | | |
| t45 | | | | | | | | | | | | | | | | |
| t46 | | | | | | | | | | | | | | | | |
| t47 | | | | | | | | | | | | | | | | |
| t48 | | | | | | | | | | | | | | | | |
| t49 | | | | | | | | | | | | | | | | |

| Prior Implementation Testing Data | |
|---|---|
| Chargeback | CF_1 |
| Rejects | CR_1 |
| Legitimate | CL_1 |
| Total | CT_1 |

| Rule Index | fraud count | legit count | already rejected count | Total |
|---|---|---|---|---|
| R1_48 | FC_R1_48_1 | LC_R1_48_1 | RC_R1_48_1 | TC_R1_48_1 |
| R1_90 | FC_R1_90_1 | LC_R1_90_1 | RC_R1_90_1 | TC_R1_90_1 |
| R1_76 | FC_R1_76_1 | LC_R1_76_1 | RC_R1_76_1 | TC_R1_76_1 |
| R1_75 | FC_R1_75_1 | LC_R1_75_1 | RC_R1_75_1 | TC_R1_75_1 |
| R1_83 | FC_R1_83_1 | LC_R1_83_1 | RC_R1_83_1 | TC_R1_83_1 |
| R1_80 | FC_R1_80_1 | LC_R1_80_1 | RC_R1_80_1 | TC_R1_80_1 |
| R1_18 | FC_R1_18_1 | LC_R1_18_1 | RC_R1_18_1 | TC_R1_18_1 |
| R1_68 | FC_R1_68_1 | LC_R1_68_1 | RC_R1_68_1 | TC_R1_68_1 |
| R1_42 | FC_R1_42_1 | LC_R1_42_1 | RC_R1_42_1 | TC_R1_42_1 |
| R1_66 | FC_R1_66_1 | LC_R1_66_1 | RC_R1_66_1 | TC_R1_66_1 |
| R3_1107 | FC_R3_1107_1 | LC_R3_1107_1 | RC_R3_1107_1 | TC_R3_1107_1 |
| R3_1110 | FC_R3_1110_1 | LC_R3_1110_1 | RC_R3_1110_1 | TC_R3_1110_1 |
| R3_1115 | FC_R3_1115_1 | LC_R3_1115_1 | RC_R3_1115_1 | TC_R3_1115_1 |
| R3_1230 | FC_R3_1230_1 | LC_R3_1230_1 | RC_R3_1230_1 | TC_R3_1230_1 |
| R3_1335 | FC_R3_1335_1 | LC_R3_1335_1 | RC_R3_1335_1 | TC_R3_1335_1 |
| R3_1342 | FC_R3_1342_1 | LC_R3_1342_1 | RC_R3_1342_1 | TC_R3_1342_1 |
| R3_1581 | FC_R3_1581_1 | LC_R3_1581_1 | RC_R3_1581_1 | TC_R3_1581_1 |
| R3_1589 | FC_R3_1589_1 | LC_R3_1589_1 | RC_R3_1589_1 | TC_R3_1589_1 |
| R3_1597 | FC_R3_1597_1 | LC_R3_1597_1 | RC_R3_1597_1 | TC_R3_1597_1 |
| R3_1607 | FC_R3_1607_1 | LC_R3_1607_1 | RC_R3_1607_1 | TC_R3_1607_1 |

1200

| Rule Index | Trigger Percent | Detect Rate | Precision | Overlap Reject Rate |
|---|---|---|---|---|
| R1_48 | 0.0120% | 0.0038% | 100.0000% | 99.8915% |
| R1_90 | 0.0005% | 0.0534% | 77.7778% | 51.3514% |
| R1_76 | 0.0022% | 0.0610% | 51.6129% | 81.3253% |
| R1_75 | 0.0053% | 0.5451% | 49.3103% | 28.9216% |
| R1_83 | 0.0414% | 3.8994% | 45.2055% | 28.8141% |
| R1_80 | 0.0439% | 3.9756% | 44.7639% | 30.8605% |
| R1_18 | 0.2671% | 23.7507% | 38.8951% | 21.8270% |
| R1_68 | 0.1020% | 8.7517% | 38.0195% | 22.8243% |
| R1_42 | 0.0112% | 0.3469% | 35.4086% | 70.1510% |
| R1_66 | 0.0044% | 0.3774% | 34.2561% | 13.9881% |
| R3_1107 | 0.0023% | 0.2546% | 26.3473% | 9.2391% |
| R3_1110 | 0.0161% | 1.2558% | 23.0606% | 26.3117% |
| R3_1115 | 0.0053% | 0.6424% | 55.5000% | 52.7187% |
| R3_1230 | 0.0011% | 0.1389% | 48.0000% | 41.8605% |
| R3_1335 | 0.0017% | 0.0868% | 22.7273% | 50.0000% |
| R3_1342 | 0.0187% | 1.5972% | 27.1654% | 31.3977% |
| R3_1581 | 0.0093% | 0.7350% | 25.0493% | 31.2076% |
| R3_1589 | 0.0044% | 0.5150% | 45.8763% | 44.8864% |
| R3_1597 | 0.0622% | 1.1285% | 28.9747% | 86.3184% |
| R3_1607 | 0.0162% | 0.1505% | 34.6667% | 94.1634% |

| Rule Index | Total | Trigger Percent | Detect Rate | Precision | Overlap Reject Rate |
|---|---|---|---|---|---|
| R1_18 | TC_R1_48_2 | 0.0335% | 0.0826% | 7.1038% | 86.7391% |
| R1_203 | TC_R1_90_2 | 0.0544% | 0.0191% | 74.9981% | 99.8216% |
| R1_42 | TC_R1_76_2 | 0.0081% | 0.0127% | 15.3845% | 96.0843% |
| R1_43 | TC_R1_75_2 | 0.0040% | 0.0318% | 62.4992% | 95.1807% |
| R1_48 | TC_R1_83_2 | 0.0139% | 0.0000% | 0.0000% | 93.9024% |
| R1_52 | TC_R1_80_2 | 0.3317% | 0.0890% | 11.1111% | 99.0781% |
| R1_66 | TC_R1_28_2 | 0.0005% | 0.0000% | 0.0000% | 55.0000% |
| R1_68 | TC_R1_68_2 | 0.0002% | 0.0000% | 0.0000% | 77.7778% |
| R1_69 | TC_R1_42_2 | 0.0001% | 0.0000% | 0.0000% | 100.0000% |
| R1_72 | TC_R1_66_2 | 0.0008% | 0.0000% | 0.0000% | 90.6250% |
| R3_1107 | TC_R3_1107_2 | 0.0032% | 0.0254% | 99.9975% | 96.9466% |
| R3_1110 | TC_R3_1110_2 | 0.0118% | 0.2605% | 99.9998% | 91.5811% |
| R3_1115 | TC_R3_1115_2 | 0.0009% | 0.0000% | 0.0000% | 100.0000% |
| R3_1230 | TC_R3_1230_2 | 0.0000% | 0.0000% | 0.0000% | 100.0000% |
| R3_1335 | TC_R3_1335_2 | 0.0012% | 0.1334% | 99.9995% | 57.1429% |
| R3_1342 | TC_R3_1342_2 | 0.0087% | 0.7243% | 99.9999% | 68.0672% |
| R3_1581 | TC_R3_1581_2 | 0.0220% | 1.7854% | 78.9326% | 60.7930% |
| R3_1589 | TC_R3_1589_2 | 0.0003% | 0.0064% | 99.9990% | 92.3077% |
| R3_1597 | TC_R3_1597_2 | 0.0285% | 1.8108% | 77.4456% | 68.7075% |
| R3_1607 | TC_R3_1607_2 | 0.0102% | 0.4320% | 79.0697% | 79.5238% |

| Post Implementation Testing Data | | |
|---|---|---|
| Chargeback | CF_2 | |
| Rejects | CR_2 | |
| Legitimate | CL_2 | |
| Total | CT_2 | |

FIG. 13

| Rule Index | Trigger Percent | Detect Rate | Precision | Overlap Reject Rate | Prior Performance Rank | Weighted Opinion On Rule Performance Metric |
|---|---|---|---|---|---|---|
| R1_49 | 0.0120% | 0.0138% | 100.0000% | 49.8915% | 1 | 3.0000 |
| R1_90 | 0.0005% | 0.0534% | 77.7778% | 51.3514% | 2 | 2.3344 |
| R3_643 | 0.1153% | 13.1597% | 59.3889% | 58.0338% | 3 | 2.0463 |
| R3_402 | 0.0011% | 0.2315% | 66.6667% | 31.8182% | 4 | 2.0046 |
| R3_449 | 0.0027% | 0.5208% | 65.2174% | 34.9057% | 5 | 1.9670 |
| R3_264 | 0.0257% | 5.2604% | 61.2121% | 26.8833% | 6 | 1.9419 |
| R3_66 | 0.0045% | 0.3299% | 64.0449% | 75.0700% | 7 | 1.9280 |
| R3_613 | 0.0311% | 5.2851% | 57.7287% | 35.6998% | 8 | 1.8381 |
| R3_697 | 0.0098% | 1.5567% | 58.8621% | 40.8797% | 9 | 1.7971 |
| R3_630 | 0.0977% | 11.5046% | 50.5724% | 49.1528% | 10 | 1.7485 |
| R3_1847 | 0.0002% | 0.0231% | 57.1429% | 63.1579% | 11 | 1.7148 |
| R3_1115 | 0.0053% | 0.6424% | 55.5000% | 52.7187% | 12 | 1.6775 |
| R3_917 | 0.0026% | 0.5556% | 54.8571% | 15.4569% | 13 | 1.6569 |
| R1_18 | 0.2671% | 23.7507% | 38.8951% | 21.8270% | 14 | 1.6448 |
| R3_659 | 0.0320% | 1.0185% | 53.9877% | 87.1197% | 15 | 1.6405 |
| R3_628 | 0.0301% | 4.3924% | 51.3879% | 37.9412% | 16 | 1.6298 |
| R3_257 | 0.0012% | 0.2961% | 53.6642% | 0.0000% | 17 | 1.6164 |
| R3_290 | 0.0012% | 0.2315% | 52.6316% | 19.1469% | 18 | 1.5836 |
| R3_252 | 0.0010% | 0.1620% | 51.8519% | 33.3333% | 19 | 1.5568 |
| R1_76 | 0.0022% | 0.0610% | 51.6129% | 61.3253% | 20 | 1.5496 |
| R3_249 | 0.0064% | 1.1111% | 50.6596% | 25.2469% | 21 | 1.5421 |
| R1_75 | 0.0063% | 0.5461% | 49.3103% | 28.9216% | 22 | 1.4903 |
| R3_414 | 0.0077% | 0.4572% | 47.8788% | 72.7733% | 23 | 1.4456 |
| R3_1230 | 0.0011% | 0.1389% | 48.0000% | 41.8669% | 24 | 1.4428 |
| R1_83 | 0.0414% | 3.8994% | 45.2055% | 28.8143% | 25 | 1.4346 |
| R1_80 | 0.0439% | 3.9756% | 44.7635% | 30.9865% | 26 | 1.4229 |
| R3_1830 | 0.0016% | 0.0850% | 46.8750% | 74.4000% | 27 | 1.4080 |
| R3_918 | 0.0028% | 0.4240% | 46.0135% | 27.2321% | 28 | 1.3891 |
| R3_1589 | 0.0044% | 0.5130% | 45.8763% | 44.9864% | 29 | 1.3866 |
| R3_905 | 0.0001% | 0.0231% | 44.4444% | 10.0000% | 30 | 1.3338 |

| Prior Implementation Performance Level | | | | | |
|---|---|---|---|---|---|
| | Trigger Percent | | | Detect Rate | |
| Rule Index | Trigger Percent | Nominal Level | Rule Index | Detect Rate | Nominal Level |
| R3_253 | 0.0001% | Low | R1_48 | 0.0038% | Low |
| R3_905 | 0.0001% | Low | R3_253 | 0.0058% | Low |
| R3_181 | 0.0002% | Low | R1_203 | 0.0076% | Low |
| R1_76 | 0.0022% | Low | R3_1914 | 0.0926% | Low |
| R3_450 | 0.0023% | Low | R3_450 | 0.0926% | Low |
| R3_1107 | 0.0023% | Low | R3_1670 | 0.1273% | Low |
| R3_1873 | 0.0026% | Low | R3_616 | 0.1331% | Low |
| R3_917 | 0.0026% | Moderate | R3_393 | 0.1331% | Moderate |
| R3_449 | 0.0027% | Moderate | R3_1230 | 0.1389% | Moderate |
| R1_42 | 0.0112% | Moderate | R3_1589 | 0.5150% | Moderate |
| R1_48 | 0.0120% | Moderate | R3_449 | 0.5208% | Moderate |
| R3_885 | 0.0148% | Moderate | R1_75 | 0.5451% | Moderate |
| R3_1717 | 0.0157% | Moderate | R3_917 | 0.5556% | Moderate |
| R3_1110 | 0.0161% | Moderate | R3_1115 | 0.6424% | Moderate |
| R3_1607 | 0.0162% | High | R3_1581 | 0.7350% | High |
| R3_1342 | 0.0187% | High | R1_69 | 0.9529% | High |
| R3_643 | 0.1153% | High | R1_9 | 11.0730% | High |
| R1_52 | 0.1320% | High | R3_630 | 11.5046% | High |
| R1_18 | 0.2671% | High | R3_643 | 13.1597% | High |
| R1_9 | 0.2905% | High | R1_18 | 23.7507% | High |

| Rule Index | Precision | Prior Implementation Performance Level Precision Nominal Level | Rule Index | Overlap Reject Rate | Overlap Reject Rate Nominal Level |
|---|---|---|---|---|---|
| R3_450 | 10.1266% | Low | R3_257 | 0.0000% | Low |
| R3_393 | 14.1104% | Low | R3_181 | 0.0000% | Low |
| R3_1670 | 14.2857% | Low | R3_904 | 4.4444% | Low |
| R3_885 | 28.5714% | Low | R3_635 | 28.5714% | Low |
| R3_1597 | 28.9747% | Low | R1_83 | 28.8141% | Low |
| R1_72 | 29.5082% | Low | R1_75 | 28.9216% | Low |
| R1_9 | 30.6467% | Low | R1_80 | 30.8605% | Low |
| R3_612 | 30.7295% | Moderate | R3_1581 | 31.2076% | Moderate |
| R3_616 | 32.3944% | Moderate | R3_1342 | 31.3977% | Moderate |
| R1_83 | 45.2055% | Moderate | R1_90 | 51.3514% | Moderate |
| R3_1589 | 45.8763% | Moderate | R3_1115 | 52.7187% | Moderate |
| R3_918 | 46.0123% | Moderate | R1_9 | 57.4589% | Moderate |
| R3_1830 | 46.8750% | Moderate | R3_643 | 58.0338% | Moderate |
| R3_414 | 47.8788% | Moderate | R3_253 | 62.5000% | Moderate |
| R3_1230 | 48.0000% | High | R3_1914 | 62.6459% | High |
| R1_75 | 49.3103% | High | R3_1847 | 63.1579% | High |
| R3_449 | 65.2174% | High | R1_203 | 98.4743% | High |
| R3_402 | 66.6667% | High | R3_885 | 99.4037% | High |
| R1_90 | 77.7778% | High | R3_1617 | 99.8075% | High |
| R1_48 | 100.0000% | High | R1_48 | 99.8915% | High |

| Rule Index | Trigger Percent | Detect Rate | Precision | Overlap Reject Rate | Post Performance Rank | Weighted Opinion On Rule Performance Metric |
|---|---|---|---|---|---|---|
| R3_1617 | 0.2718% | 3.5898% | 98.2600% | 94.8861% | 1 | 3.0235 |
| R3_1342 | 0.0087% | 0.7243% | 99.9999% | 68.0672% | 2 | 3.0146 |
| R3_630 | 0.0139% | 0.3113% | 99.9998% | 91.4485% | 3 | 3.0064 |
| R3_866 | 0.0155% | 0.2986% | 99.9998% | 92.6563% | 4 | 3.0062 |
| R3_1110 | 0.0118% | 0.2605% | 99.9999% | 91.5811% | 5 | 3.0054 |
| R3_1670 | 0.0655% | 0.2160% | 99.9997% | 98.7412% | 6 | 3.0053 |
| R3_1335 | 0.0012% | 0.1334% | 99.9995% | 57.1429% | 7 | 3.0027 |
| R3_659 | 0.0194% | 0.1144% | 99.9994% | 97.7444% | 8 | 3.0025 |
| R3_637 | 0.0003% | 0.0635% | 99.9990% | 28.5714% | 9 | 3.0012 |
| R3_264 | 0.0003% | 0.0318% | 99.9980% | 58.3333% | 10 | 3.0006 |
| R3_1107 | 0.0022% | 0.0254% | 99.9975% | 96.9466% | 11 | 3.0005 |
| R3_1847 | 0.0001% | 0.0191% | 99.9967% | 50.0000% | 12 | 3.0003 |
| R3_885 | 0.0120% | 0.0127% | 99.9950% | 99.5951% | 13 | 3.0003 |
| R3_1830 | 0.0080% | 0.0127% | 99.9950% | 99.3902% | 14 | 3.0002 |
| R3_1589 | 0.0003% | 0.0064% | 99.9900% | 92.3077% | 15 | 2.9998 |
| R3_402 | 0.0003% | 0.0064% | 99.9900% | 91.6667% | 16 | 2.9998 |
| R3_1914 | 0.0001% | 0.0064% | 99.9900% | 80.0000% | 17 | 2.9998 |
| R3_646 | 0.0124% | 0.4384% | 95.8333% | 85.9375% | 18 | 2.8839 |
| R3_659 | 0.0074% | 0.0826% | 92.8565% | 95.4248% | 19 | 2.7875 |
| R3_1717 | 0.0162% | 0.1080% | 89.4732% | 97.1514% | 20 | 2.6866 |
| R3_613 | 0.0051% | 0.0445% | 87.4989% | 96.1722% | 21 | 2.6259 |
| R3_643 | 0.0079% | 0.2160% | 87.1783% | 98.7850% | 22 | 2.6208 |
| R3_1581 | 0.0220% | 1.7654% | 78.9326% | 80.7930% | 23 | 2.4040 |
| R3_1607 | 0.0302% | 0.4320% | 79.0637% | 79.5238% | 24 | 2.3809 |
| R3_1597 | 0.0285% | 1.8108% | 77.4456% | 68.7075% | 25 | 2.3600 |
| R3_628 | 0.0071% | 0.4575% | 77.4193% | 68.3673% | 26 | 2.3318 |
| R1_203 | 0.0544% | 0.0191% | 74.9381% | 99.8216% | 27 | 2.2511 |
| R3_182 | 0.0002% | 0.0318% | 71.4276% | 0.0000% | 28 | 2.1435 |
| R3_450 | 0.0060% | 0.9403% | 66.0714% | 10.0402% | 29 | 2.0010 |
| R1_43 | 0.0040% | 0.0318% | 62.4932% | 95.1807% | 30 | 1.8757 |

| Rule Index | Trigger Percent | Trigger Percent Nominal Level | Rule Index | Detect Rate | Detect Rate Nominal Level |
|---|---|---|---|---|---|
| R3_257 | 0.0000% | Low | R1_48 | 0.0000% | Low |
| R3_634 | 0.0000% | Low | R3_414 | 0.0000% | Low |
| R3_918 | 0.0000% | Low | R3_393 | 0.0000% | Low |
| R3_181 | 0.0002% | Low | R3_635 | 0.0000% | Low |
| R3_252 | 0.0002% | Low | R1_75 | 0.0000% | Low |
| R3_616 | 0.0002% | Low | R1_76 | 0.0000% | Low |
| R1_68 | 0.0002% | Low | R1_84 | 0.0000% | Low |
| R3_250 | 0.0003% | Moderate | R3_1230 | 0.0000% | Moderate |
| R3_264 | 0.0003% | Moderate | R3_910 | 0.0000% | Moderate |
| R1_43 | 0.0040% | Moderate | R1_203 | 0.0191% | Moderate |
| R3_613 | 0.0051% | Moderate | R3_1107 | 0.0254% | Moderate |
| R3_450 | 0.0060% | Moderate | R3_264 | 0.0318% | Moderate |
| R3_628 | 0.0071% | Moderate | R3_182 | 0.0318% | Moderate |
| R3_658 | 0.0074% | Moderate | R1_43 | 0.0318% | Moderate |
| R3_1597 | 0.0285% | High | R3_630 | 0.3113% | High |
| R1_18 | 0.0335% | High | R3_1607 | 0.4320% | High |
| R1_203 | 0.0544% | High | R3_646 | 0.4384% | High |
| R3_1670 | 0.0655% | High | R3_628 | 0.4575% | High |
| R3_643 | 0.0779% | High | R3_1342 | 0.7243% | High |
| R3_1617 | 0.2718% | High | R3_1597 | 1.8108% | High |
| R1_52 | 0.3317% | High | R3_1617 | 3.5898% | High |

Header spans: "Post Implementation Performance Level"

| Rule Index | Post Implementation Performance Level | | | Rule Index | Overlap Reject | | |
|---|---|---|---|---|---|---|---|
| | Precision | Precision Nominal Level | | | Overlap Reject Rate | Overlap Reject Rate Nominal Level | |
| R1_48 | 0.0000% | Low | | R3_182 | 0.0000% | Low | |
| R3_414 | 0.0000% | Low | | R3_904 | 0.0000% | Low | |
| R3_393 | 0.0000% | Low | | R3_905 | 0.0000% | Low | |
| R3_635 | 0.0000% | Low | | R3_616 | 75.0000% | Low | |
| R1_75 | 0.0000% | Low | | R1_68 | 77.7778% | Low | |
| R1_76 | 0.0000% | Low | | R3_449 | 78.9474% | Low | |
| R1_84 | 0.0000% | Low | | R3_1607 | 79.5238% | Low | |
| R3_1230 | 0.0000% | Moderate | | R3_1914 | 80.0000% | Moderate | |
| R3_910 | 0.0000% | Moderate | | R3_646 | 85.9375% | Moderate | |
| R3_182 | 71.4276% | Moderate | | R3_1717 | 97.1514% | Moderate | |
| R1_203 | 74.9981% | Moderate | | R3_1873 | 97.4359% | Moderate | |
| R3_628 | 77.4193% | Moderate | | R3_659 | 97.7444% | Moderate | |
| R3_1597 | 77.4456% | Moderate | | R3_612 | 98.7397% | Moderate | |
| R3_1581 | 78.9326% | Moderate | | R3_1670 | 98.7412% | Moderate | |
| R3_264 | 99.9980% | High | | R3_253 | 100.0000% | High | |
| R3_637 | 99.9990% | High | | R1_69 | 100.0000% | High | |
| R3_659 | 99.9994% | High | | R3_635 | 100.0000% | High | |
| R3_1335 | 99.9995% | High | | R1_75 | 100.0000% | High | |
| R3_1670 | 99.9997% | High | | R1_76 | 100.0000% | High | |
| R3_630 | 99.9998% | High | | R3_910 | 100.0000% | High | |
| R3_1342 | 99.9999% | High | | R1_90 | 100.0000% | High | |

FIG. 20

|  | Rule Trigger Total | TRTPC | | | | | |
|---|---|---|---|---|---|---|---|
|  |  | TRTPC1 | TRTPC2 | TRTPC3 | TRTPC4 | TRTPC5 | TRTPC6 |
| R1_18 | TC_R1_18 | C_R1_18_1 | C_R1_18_2 | C_R1_18_3 | C_R1_18_4 | C_R1_18_5 | C_R1_18_6 |
| R1_203 | TC_R1_203 | C_R1_203_1 | C_R1_203_2 | C_R1_203_3 | C_R1_203_4 | C_R1_203_5 | C_R1_203_6 |
| R1_42 | TC_R1_42 | C_R1_42_1 | C_R1_42_2 | C_R1_42_3 | C_R1_42_4 | C_R1_42_5 | C_R1_42_6 |
| R1_43 | TC_R1_43 | C_R1_43_1 | C_R1_43_2 | C_R1_43_3 | C_R1_43_4 | C_R1_43_5 | C_R1_43_6 |
| R1_48 | TC_R1_48 | C_R1_48_1 | C_R1_48_2 | C_R1_48_3 | C_R1_48_4 | C_R1_48_5 | C_R1_48_6 |
| R1_52 | TC_R1_52 | C_R1_52_1 | C_R1_52_2 | C_R1_52_3 | C_R1_52_4 | C_R1_52_5 | C_R1_52_6 |
| R1_80 | TC_R1_80 | C_R1_80_1 | C_R1_80_2 | C_R1_80_3 | C_R1_80_4 | C_R1_80_5 | C_R1_80_6 |
| R1_83 | TC_R1_83 | C_R1_83_1 | C_R1_83_2 | C_R1_83_3 | C_R1_83_4 | C_R1_83_5 | C_R1_83_6 |
| R1_9 | TC_R1_9 | C_R1_9_1 | C_R1_9_2 | C_R1_9_3 | C_R1_9_4 | C_R1_9_5 | C_R1_9_6 |
| R1_90 | TC_R1_90 | C_R1_90_1 | C_R1_90_2 | C_R1_90_3 | C_R1_90_4 | C_R1_90_5 | C_R1_90_6 |
| R3_1110 | TC_R3_1110 | C_R3_1110_1 | C_R3_1110_2 | C_R3_1110_3 | C_R3_1110_4 | C_R3_1110_5 | C_R3_1110_6 |
| R3_1115 | TC_R3_1115 | C_R3_1115_1 | C_R3_1115_2 | C_R3_1115_3 | C_R3_1115_4 | C_R3_1115_5 | C_R3_1115_6 |
| R3_1342 | TC_R3_1342 | C_R3_1342_1 | C_R3_1342_2 | C_R3_1342_3 | C_R3_1342_4 | C_R3_1342_5 | C_R3_1342_6 |
| R3_1581 | TC_R3_1581 | C_R3_1581_1 | C_R3_1581_2 | C_R3_1581_3 | C_R3_1581_4 | C_R3_1581_5 | C_R3_1581_6 |
| R3_1597 | TC_R3_1597 | C_R3_1597_1 | C_R3_1597_2 | C_R3_1597_3 | C_R3_1597_4 | C_R3_1597_5 | C_R3_1597_6 |
| R3_1607 | TC_R3_1607 | C_R3_1607_1 | C_R3_1607_2 | C_R3_1607_3 | C_R3_1607_4 | C_R3_1607_5 | C_R3_1607_6 |
| R3_1617 | TC_R3_1617 | C_R3_1617_1 | C_R3_1617_2 | C_R3_1617_3 | C_R3_1617_4 | C_R3_1617_5 | C_R3_1617_6 |
| R3_1717 | TC_R3_1717 | C_R3_1717_1 | C_R3_1717_2 | C_R3_1717_3 | C_R3_1717_4 | C_R3_1717_5 | C_R3_1717_6 |
| R3_1914 | TC_R3_1914 | C_R3_1914_1 | C_R3_1914_2 | C_R3_1914_3 | C_R3_1914_4 | C_R3_1914_5 | C_R3_1914_6 |
| R3_249 | TC_R3_249 | C_R3_249_1 | C_R3_249_2 | C_R3_249_3 | C_R3_249_4 | C_R3_249_5 | C_R3_249_6 |
| R3_250 | TC_R3_250 | C_R3_250_1 | C_R3_250_2 | C_R3_250_3 | C_R3_250_4 | C_R3_250_5 | C_R3_250_6 |
| R3_252 | TC_R3_252 | C_R3_252_1 | C_R3_252_2 | C_R3_252_3 | C_R3_252_4 | C_R3_252_5 | C_R3_252_6 |
| R3_449 | TC_R3_449 | C_R3_449_1 | C_R3_449_2 | C_R3_449_3 | C_R3_449_4 | C_R3_449_5 | C_R3_449_6 |
| R3_450 | TC_R3_450 | C_R3_450_1 | C_R3_450_2 | C_R3_450_3 | C_R3_450_4 | C_R3_450_5 | C_R3_450_6 |
| R3_612 | TC_R3_612 | C_R3_612_1 | C_R3_612_2 | C_R3_612_3 | C_R3_612_4 | C_R3_612_5 | C_R3_612_6 |
| R3_613 | TC_R3_613 | C_R3_613_1 | C_R3_613_2 | C_R3_613_3 | C_R3_613_4 | C_R3_613_5 | C_R3_613_6 |
| R3_630 | TC_R3_630 | C_R3_630_1 | C_R3_630_2 | C_R3_630_3 | C_R3_630_4 | C_R3_630_5 | C_R3_630_6 |
| R3_643 | TC_R3_643 | C_R3_643_1 | C_R3_643_2 | C_R3_643_3 | C_R3_643_4 | C_R3_643_5 | C_R3_643_6 |
| R3_646 | TC_R3_646 | C_R3_646_1 | C_R3_646_2 | C_R3_646_3 | C_R3_646_4 | C_R3_646_5 | C_R3_646_6 |
| R3_659 | TC_R3_659 | C_R3_659_1 | C_R3_659_2 | C_R3_659_3 | C_R3_659_4 | C_R3_659_5 | C_R3_659_6 |
| R3_665 | TC_R3_665 | C_R3_665_1 | C_R3_665_2 | C_R3_665_3 | C_R3_665_4 | C_R3_665_5 | C_R3_665_6 |
| R3_666 | TC_R3_666 | C_R3_666_1 | C_R3_666_2 | C_R3_666_3 | C_R3_666_4 | C_R3_666_5 | C_R3_666_6 |
| R3_885 | TC_R3_885 | C_R3_885_1 | C_R3_885_2 | C_R3_885_3 | C_R3_885_4 | C_R3_885_5 | C_R3_885_6 |
| R3_918 | TC_R3_918 | C_R3_918_1 | C_R3_918_2 | C_R3_918_3 | C_R3_918_4 | C_R3_918_5 | C_R3_918_6 |

|  | TRTPC | | | | | |
|---|---|---|---|---|---|---|
|  | TRTPC1 | TRTPC2 | TRTPC3 | TRTPC4 | TRTPC5 | TRTPC6 |
| TRTPC Total Volume | TC1 | TC2 | 15 | TC4 | TC5 | TC6 |
| TRTPC Rule Trigger Union Count | UC1 | UC2 | 15 | UC4 | UC5 | UC6 |
| TRTPC Rule Trigger Overlap Count | OC1 | OC2 | 31 | OC4 | OC5 | OC6 |
| Over Trigger Percent | 7.05% | 9.98% | 106.67% | 26.57% | 22.83% | 4.29% |

| | Rule Trigger Total | Rule Trigger Distribution on Each TRTPC | | | | | |
|---|---|---|---|---|---|---|---|
| | | TRTPC1 | TRTPC2 | TRTPC3 | TRTPC4 | TRTPC5 | TRTPC6 |
| R1_18 % | TC_R1_18 | 0.00% | 0.00% | 0.00% | 100.00% | 0.00% | 0.00% |
| R1_203 % | TC_R1_203 | 100.00% | 0.00% | 0.00% | 0.00% | 0.00% | 0.00% |
| R1_42 % | TC_R1_42 | 99.67% | 0.00% | 0.00% | 0.00% | 0.00% | 0.33% |
| R1_52 % | TC_R1_52 | 0.00% | 100.00% | 0.00% | 0.00% | 0.00% | 0.00% |
| R1_80 % | TC_R1_80 | 0.00% | 0.00% | 100.00% | 0.00% | 0.00% | 0.00% |
| R1_83 % | TC_R1_83 | 0.00% | 0.00% | 100.00% | 0.00% | 0.00% | 0.00% |
| R1_84 % | TC_R1_84 | #DIV/0! | #DIV/0! | #DIV/0! | #DIV/0! | #DIV/0! | #DIV/0! |
| R1_9 % | TC_R1_9 | 100.00% | 0.00% | 0.00% | 0.00% | 0.00% | 0.00% |
| R1_90 % | TC_R1_90 | #DIV/0! | #DIV/0! | #DIV/0! | #DIV/0! | #DIV/0! | #DIV/0! |
| R3_1107 % | TC_R3_1107 | 100.00% | 0.00% | 0.00% | 0.00% | 0.00% | 0.00% |
| R3_1110 % | TC_R3_1110 | 95.09% | 4.91% | 0.00% | 0.00% | 0.00% | 0.00% |
| R3_1597 % | TC_R3_1597 | 95.47% | 3.25% | 0.00% | 0.77% | 0.17% | 0.34% |
| R3_1607 % | TC_R3_1607 | 96.01% | 2.00% | 0.00% | 0.25% | 0.50% | 1.25% |
| R3_1817 % | TC_R3_1617 | 100.00% | 0.00% | 0.00% | 0.00% | 0.00% | 0.00% |
| R3_1670 % | TC_R3_1670 | 99.84% | 0.00% | 0.00% | 0.16% | 0.00% | 0.00% |
| R3_1717 % | TC_R3_1717 | 0.00% | 2.76% | 0.00% | 0.46% | 0.23% | 96.54% |
| R3_1914 % | TC_R3_1914 | 81.82% | 0.00% | 0.00% | 0.00% | 18.18% | 0.00% |
| R3_249 % | TC_R3_249 | 71.09% | 0.00% | 0.00% | 28.91% | 0.00% | 0.00% |
| R3_450 % | TC_R3_450 | 100.00% | 0.00% | 0.00% | 0.00% | 0.00% | 0.00% |
| R3_612 % | TC_R3_612 | 93.36% | 6.60% | 0.00% | 0.02% | 0.00% | 0.02% |
| R3_613 % | TC_R3_613 | 97.41% | 2.59% | 0.00% | 0.00% | 0.00% | 0.00% |
| R3_616 % | TC_R3_616 | 100.00% | 0.00% | 0.00% | 0.00% | 0.00% | 0.00% |
| R3_628 % | TC_R3_628 | 93.96% | 6.04% | 0.00% | 0.00% | 0.00% | 0.00% |
| R3_659 % | TC_R3_659 | 81.03% | 13.55% | 0.00% | 3.33% | 0.74% | 1.35% |
| R3_665 % | TC_R3_665 | 80.00% | 20.00% | 0.00% | 0.00% | 0.00% | 0.00% |
| R3_666 % | TC_R3_666 | 93.89% | 2.99% | 0.00% | 2.31% | 0.54% | 0.27% |
| R3_885 % | TC_R3_885 | 96.77% | 3.23% | 0.00% | 0.00% | 0.00% | 0.00% |
| R3_904 % | TC_R3_904 | #DIV/0! | #DIV/0! | #DIV/0! | #DIV/0! | #DIV/0! | #DIV/0! |
| R3_905 % | TC_R3_905 | 100.00% | 0.00% | 0.00% | 0.00% | 0.00% | 0.00% |
| R3_909 % | TC_R3_909 | 100.00% | 0.00% | 0.00% | 0.00% | 0.00% | 0.00% |
| R3_910 % | TC_R3_910 | 100.00% | 0.00% | 0.00% | 0.00% | 0.00% | 0.00% |
| | TRTPC Volume | TC1 | TC2 | TC3 | TC4 | TC5 | TC6 |

|  |  | Rule Trigger Coverage Percent of Each TRTPC | | | | | |
|---|---|---|---|---|---|---|---|
|  | Rule Trigger Total | TRTPC1 % | TRTPC2 % | TRTPC3 % | TRTPC4 % | TRTPC5 % | TRTPC6 % |
| R1_18 | TC_R1_18 | 0.00% | 0.00% | 0.00% | 100.00% | 0.00% | 0.00% |
| R1_203 | TC_R1_203 | 7.68% | 0.00% | 0.00% | 0.00% | 0.00% | 0.00% |
| R1_42 | TC_R1_42 | 0.92% | 0.00% | 0.00% | 0.00% | 0.00% | 0.11% |
| R1_52 | TC_R1_52 | 0.00% | 100.00% | 0.00% | 0.00% | 0.00% | 0.00% |
| R1_80 | TC_R1_80 | 0.00% | 0.00% | 100.00% | 0.00% | 0.00% | 0.00% |
| R1_83 | TC_R1_83 | 0.00% | 0.00% | 100.00% | 0.00% | 0.00% | 0.00% |
| R1_84 | TC_R1_84 | 0.00% | 0.00% | 0.00% | 0.00% | 0.00% | 0.00% |
| R1_9 | TC_R1_9 | 21.48% | 0.00% | 0.00% | 0.00% | 0.00% | 0.00% |
| R1_90 | TC_R1_90 | 0.00% | 0.00% | 0.00% | 0.00% | 0.00% | 0.00% |
| R3_1107 | TC_R3_1107 | 0.48% | 0.00% | 0.00% | 0.00% | 0.00% | 0.00% |
| R3_1110 | TC_R3_1110 | 1.19% | 0.16% | 0.00% | 0.00% | 0.00% | 0.00% |
| R3_1597 | TC_R3_1597 | 3.45% | 0.30% | 0.00% | 0.59% | 1.57% | 0.43% |
| R3_1607 | TC_R3_1607 | 1.19% | 0.06% | 0.00% | 0.07% | 1.57% | 0.54% |
| R3_1617 | TC_R3_1617 | 27.47% | 0.00% | 0.00% | 0.00% | 0.00% | 0.00% |
| R3_1670 | TC_R3_1670 | 1.92% | 0.00% | 0.00% | 0.07% | 0.00% | 0.00% |
| R3_1717 | TC_R3_1717 | 0.00% | 0.09% | 0.00% | 0.13% | 0.79% | 44.91% |
| R3_1914 | TC_R3_1914 | 0.03% | 0.00% | 0.00% | 0.00% | 1.57% | 0.00% |
| R3_249 | TC_R3_249 | 0.28% | 0.00% | 0.00% | 2.42% | 0.00% | 0.00% |
| R3_450 | TC_R3_450 | 0.75% | 0.00% | 0.00% | 0.00% | 0.00% | 0.00% |
| R3_612 | TC_R3_612 | 14.38% | 2.57% | 0.00% | 0.07% | 0.00% | 0.11% |
| R3_613 | TC_R3_613 | 0.58% | 0.04% | 0.00% | 0.00% | 0.00% | 0.00% |
| R3_616 | TC_R3_616 | 0.11% | 0.00% | 0.00% | 0.00% | 0.00% | 0.00% |
| R3_628 | TC_R3_628 | 1.11% | 0.18% | 0.00% | 0.00% | 0.00% | 0.00% |
| R3_659 | TC_R3_659 | 2.03% | 0.86% | 0.00% | 1.77% | 4.72% | 1.18% |
| R3_665 | TC_R3_665 | 0.01% | 0.01% | 0.00% | 0.00% | 0.00% | 0.00% |
| R3_666 | TC_R3_666 | 2.13% | 0.17% | 0.00% | 1.11% | 3.15% | 0.21% |
| R3_885 | TC_R3_885 | 1.85% | 0.16% | 0.00% | 0.00% | 0.00% | 0.00% |
| R3_904 | TC_R3_904 | 0.00% | 0.00% | 0.00% | 0.00% | 0.00% | 0.00% |
| R3_905 | TC_R3_905 | 0.00% | 0.00% | 0.00% | 0.00% | 0.00% | 0.00% |
| R3_909 | TC_R3_909 | 0.02% | 0.00% | 0.00% | 0.00% | 0.00% | 0.00% |
| R3_910 | TC_R3_910 | 0.00% | 0.00% | 0.00% | 0.00% | 0.00% | 0.00% |
|  | TRTPC Volume | TC1 | TC2 | TC3 | TC4 | TC5 | TC6 |

FIG. 24

| Current Rejection Rate 7.58%, XX out of YYYY been rejected | | Cumulative Impact: Reduction Percent of Rejection | Total Volume YYYY | Total Reject XX |
|---|---|---|---|---|
| Rule_ID | Recommendation | Notes | | Total Rejection Percentage Cumulative Change | Total Rejection Counts Cumulative Change |
| R3_83andR1_80 | ADD | consolidation | 0.00% | 7.58% | XX |
| R3_250orR3_1115 | ADD | consolidation | 0.00% | 7.58% | XX |
| R3_1116orR3_1670 | ADD | consolidation | 0.00% | 7.58% | XX |
| R1_83 | REMOVE | covered by consolidation | 0.00% | 7.58% | XX |
| R3_649 | REMOVE | covered by consolidation | 0.00% | 7.58% | XX |
| R3_1561 | REMOVE | covered by consolidation | 0.00% | 7.58% | XX |
| R3_1597 | REMOVE | covered by consolidation | 0.00% | 7.58% | XX |
| R3_666 | REMOVE | covered by consolidation | 0.00% | 7.58% | XX |
| R3_393 | REMOVE | performance low | -0.00% | 7.58% | XX |
| R3_909 | REMOVE | performance low | -0.12% | 7.57% | XX1 |
| R1_52 | REMOVE | performance low and not triggering | -0.16% | 7.57% | XX2 |
| R3_918 | REMOVE | performance low and not triggering | -0.16% | 7.57% | XX3 |
| R3_2230 | REMOVE | performance low | -0.16% | 7.57% | XX3 |
| R3_414 | REMOVE | performance low | -0.16% | 7.57% | XX3 |
| R3_904 | REMOVE | performance low and not triggering | -0.16% | 7.57% | XX3 |
| R1_864 | REMOVE | performance low and not triggering | -0.16% | 7.57% | XX3 |
| R3_913 | REMOVE | performance low and not triggering | -0.16% | 7.57% | XX3 |
| R1_90 | Set to Surveillance | performance moderate and not triggering | -0.16% | 7.57% | XX3 |

| Rule ID | Recommendation | Trigger Percent Nominal Level | rule performance description, prior implementation | | | rule performance description, post implementation | | | | Cumulative Impact Reduction Percent of Rejection |
|---|---|---|---|---|---|---|---|---|---|---|
| | | | Detect Rate Nominal Level | Precision Nominal Level | Overlap Reject Rate Nominal Level | Trigger Percent Nominal Level | Detect Rate Nominal Level | Precision Nominal Level | Overlap Reject Rate Nominal Level | |
| R1_83andR1_80 | ADD | | | | | | | | | 0.00% |
| R1_392orR3_643 | ADD | | | | | | | | | 0.00% |
| R3_1160orR3_1670 | ADD | | | | | | | | | 0.00% |
| R1_83 | REMOVE | High | High | Moderate | Low | Moderate | Low | Low | High | 0.00% |
| R3_612 | REMOVE | High | High | Moderate | High | High | High | Moderate | Moderate | 0.00% |
| R1_1617 | REMOVE | High | Low | Moderate | High | High | Moderate | High | Moderate | 0.00% |
| R1_203 | REMOVE | Moderate | Low | Low | Moderate | High | Moderate | Moderate | High | 0.00% |
| R3_1597 | REMOVE | High | High | High | Moderate | Moderate | Low | Moderate | Low | 0.00% |
| R3_628 | REMOVE | High | Low | Moderate | Moderate | Low | Low | Low | High | 0.00% |
| R3_213 | REMOVE | Low | Low | Low | High | Moderate | Low | Low | High | 0.00% |
| R3_398 | REMOVE | Moderate | Moderate | Low | High | Moderate | Low | Low | Moderate | 0.00% |
| R3_1873 | REMOVE | Low | Low | Moderate | Moderate | Moderate | Low | Low | Moderate | -0.01% |
| R1_72 | REMOVE | Low | Low | Moderate | Moderate | Low | Low | Moderate | Low | -0.05% |
| R3_636 | REMOVE | Moderate | Moderate | Moderate | Low | Moderate | High | Moderate | Moderate | -0.12% |
| R1_86 | REMOVE | High | High | Low | Moderate | High | Moderate | Moderate | High | -0.12% |
| R1_9 | REMOVE | High | High | Low | Moderate | Low | Low | Low | Low | -0.12% |
| R1_69 | REMOVE | Moderate | Moderate | Moderate | Low | Moderate | Moderate | Moderate | High | -0.15% |
| R3_910 | REMOVE | High | High | High | Moderate | Moderate | Low | Moderate | High | -0.15% |
| R3_909 | REMOVE | Low | Moderate | Moderate | Low | Low | Low | Low | Low | -0.15% |
| R3_1230 | REMOVE | Moderate | Moderate | Moderate | High | High | Moderate | High | High | -0.15% |
| R3_414 | REMOVE | Moderate | Moderate | Moderate | Low | Low | Moderate | Low | Low | -0.15% |
| R3_906 | REMOVE | Moderate | Low | Low | Moderate | Low | Low | Low | Low | -0.15% |
| R1_84 | REMOVE | Low | Moderate | High | Low | Low | Moderate | Moderate | Low | -0.15% |
| R3_913 | Set to Surveillance | Low | Moderate | High | Low | Low | Low | Moderate | Low | -0.16% |
| R3_237 | Set to Surveillance | Moderate | Moderate | High | Low | Low | Low | Moderate | Low | -0.16% |
| R3_917 | Set to Surveillance | Low | Low | Low | Moderate | Low | Low | Moderate | Low | -0.16% |
| R1_90 | Set to Surveillance | Low | Low | High | Moderate | Low | Moderate | Moderate | High | -0.16% |

TECHNIQUES FOR REDUNDANT ACCESS RULE MANAGEMENT

CROSS REFERENCE TO RELATED APPLICATIONS

This application is a continuation application of U.S. application Ser. No. 17/084,492, filed on Oct. 29, 2020, which is herein incorporated by reference in its entirety for all purposes

BACKGROUND

Resource providers may generate rules that are applied to access requests. The rules can, for example, prevent fraudulent access from occurring. Over time, the resource provider may generate hundreds or thousands of rules. For example, a rule can be generated for each type of fraudulent access request.

Rules may be created that overlap or perform similar functions. Rules may be provided by different people, such as different employees of the resource provider or by users that have different roles. Users that perform different roles may be creating similar rules. As rules continue to be created by a resource provider, entire rules or portions of rules may perform the same or similar functions. This can result in a large number of redundant rules that continue to be stored and maintained by a resource provider.

Resource providers may be reluctant to remove rules since they cannot readily determine the function of each of the rules. It could take a significant amount of time for the resource provider to determine whether a rule is redundant. This time is multiplied given the hundreds of rules that may exist in the system of a resource provider.

Further, resource providers may end up removing rules that are needed and/or applicable to current access requests. This can result in errors in the processing of access requests. It can also be difficult to determine which rules should be maintained and which rules should be removed. It may be unclear if rules perform a same task.

As a result, the number of rules and rule profiles proliferates and can become unwieldly and difficult to manage.

Further, multiple rules may be triggered. The triggering of multiple rules can also be known as co-triggering. Co-triggering can result in errors and discrepancies. Further, older rules may also have decayed performance. That is, older rules do not operate as well as newer rules.

The rules can also use excessive storage. The number of rules created and stored by a resource provider may be close to or more than a maximum allowable number of rules that can be handled by a resource security system. Further, it could take an excessive amount of user and processor time to check whether rules overlap.

Therefore, determining whether there are overlapping rules can be a drain on computing resources and other resources. Due to the difficulty of determining whether rules overlap, the resource provider will continue to maintain the rules in their system resulting in many inefficiencies.

Example embodiments of the disclosure address these and other problems, individually and collectively.

SUMMARY

Example embodiments provide techniques for determining whether rules overlap, and whether the overlapping rules should be removed. Specifically, example embodiments provide systems and methods for identifying redundant rules or rules that overlap each other. Further, example embodiments assist a user in determining how to address redundant or overlapping rules.

A resource provider may start with a few profiles, each having only a few rules. But, over time, a resource provider generally add rules for specific cyberattacks (e.g., certain types of fraud). Further, rules may be provided by different users. Therefore, users performing different roles may be creating similar rules.

A resource provider is reluctant to remove rules, as they worry it could have a negative impact on their business. Therefore, resource provides will continue to add new rules and do not remove old rules that may perform a same or similar function.

As a result, there may be a large number of overlapping rules. Overlapping rules can also be known as redundant rules or duplicate rules. An overlapping rule is a rule that performs a same or similar function to another rule that exists in the resource security system.

Therefore, an example embodiment provides a system and method for managing redundant rules. Example embodiments provide systems, methods and computer readable media with can manage redundant rules in an access server.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 7 illustrates a table comprising rules and indicator values, in accordance with some example embodiments.

FIG. 10 illustrates a table of transactions with learned cluster labels and rule trigger indicators, in accordance with some example embodiments.

FIG. 11 illustrates a table of transactions counts in rules that are triggering, in accordance with some example embodiments.

FIG. 12 illustrates a table including rule performance metrics prior to implementation, in accordance with some example embodiments.

FIG. 13 illustrates a table including rule performance metrics post implementation, in accordance with some example embodiment.

FIG. 14 illustrates a table including rule performance rank prior to implementation, in accordance with some example embodiments.

FIG. 15 illustrates a table including rule performance description prior to implementation, in accordance with some example embodiments.

FIG. 16 illustrates a table including additional rule performance descriptions, prior to implementation, in accordance with some example embodiments.

FIG. 17 illustrates a table including rule performance rank, after implementation, in accordance with some example embodiments.

FIG. 19 illustrates a table including rule performance descriptions, after implementation, in accordance with some example embodiments.

FIG. 20 illustrates an additional table including rule performance descriptions, after implementation, in accordance with some example embodiments.

FIG. 21 illustrates a table including transactions clusters, in accordance with some example embodiments.

FIG. 22 illustrates a table displaying an over trigger percent for Transaction Rule Triggering Pattern Clusters (TRTPC), in accordance with some example embodiments.

FIG. 23 illustrates a table including a rule trigger distribution for Transaction Rule Triggering Pattern Clusters (TRTPC), in accordance with some example embodiments.

FIG. 24 illustrates a table including a rule triggered coverage percent of each Transaction Rule Triggering Pattern Clusters (TRTPC), in accordance with some example embodiments.

FIG. 27 illustrates a table including an intermediate impact evaluation of rule janitor action, in accordance with some example embodiments.

FIG. 28 illustrates a table comprising rule janitor output information, in accordance with some example embodiments.

TERMS

Figure 1:
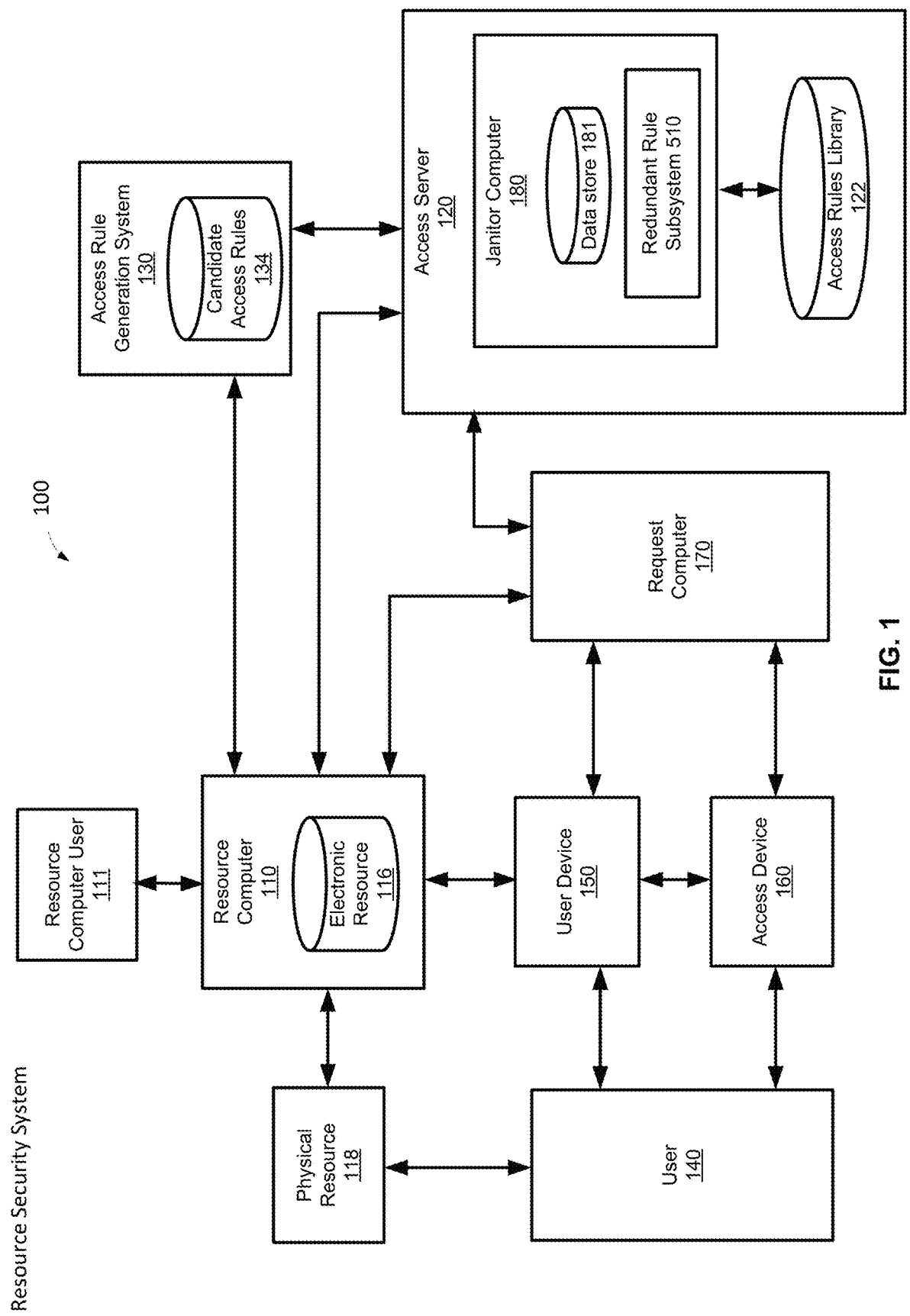
FIG. 1 shows a resource security system for authorizing access to resources, in accordance with some example embodiments.

Prior to discussing the details of some embodiments of the present disclosure, description of some terms may be helpful in understanding the various embodiments.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), table PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.) that control physical access to locations (e.g., venues, transit stations, homes, offices, buildings, etc.) as well as software devices that control access to data or information. In embodiments, the access device may be configured to charge or recharge a user device via contact or contactless modes of operation.

The term "access request" generally refers to a request to access a resource. An access request and a transaction can be used interchangeably. The access request may be received from a requesting computer, a user device, or a resource computer, for example. The access request may include authorization information, such as a user name, account number, or password. The access request may also include access request parameters, such as an access request identifier, a resource identifier, a timestamp, a date, a device or computer identifier, a geo-location, or any other suitable information. The access requests can be received in real time.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof.

An "access rule outcome" of an access rule may represent an outcome determined by that rule based on one or more conditions of the rule and the parameters of the access request. For example, an access rule may provide an access rule outcome of either "reject," "accept," or "review," when its conditions are involved by an access request.

The term "access request outcome" may include any determination of whether to grant access to the resource. The access request outcomes may include "accept," "reject," or "review." In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

An "authorization request message" may be an electronic message that requests authorization for an interaction. In some embodiments, an authorization request message can be sent to an authorization computer and/or an issuer of a payment card to request authorization for a transaction. A transaction can also be known as an access request. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction or access request.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity. In embodiments, the authorization computer may maintain a trusted clock for providing the time stamp information to user devices during manufacture or during personalization with a user.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "profile" may refer to identifying information for different types of transactions. Different types of transactions can include different profiles. Further, profiles can include one or more rules that are associated with the profile. A profile name can correspond to a type of transaction that often occurs for resource providers.

The term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

The term "redundant rule" may refer to a rule that has a similar function to another rule. A redundant rule may not have the exact same parameters of another rule to be considered redundant. A rule may be a redundant rule if parameters of the rule overlap with parameters of another rule. A rule may be considered redundant if removal of the rule does not affect the operation of the resource security system.

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A "request processing system" can include one or more computers for processing payment. The request processing system can be, for example, a payment management system for electronic commerce.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

The term "transaction" may include an exchange or interaction between two entities. In some embodiments, a transaction may refer to a transfer of value between two users (e.g., individuals or entities). A transaction may also be known as an access request. A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

The term "transaction cluster" or "access request cluster" may include a plurality of transactions that are grouped together. Transactions can also be known as access requests. Given a plurality of transactions, the transactions can be grouped into one or more clusters. The transactions that are grouped into a same cluster may trigger similar access rules. Therefore, a first transaction cluster may have transactions that trigger a first access rule and a second transaction cluster may have rules that trigger a second access rule.

A "user device" may be any suitable device that is operated by a user. Suitable user devices can be portable and can communicate with external entities such as access devices. Examples of user devices include cards that have data stored on them, access cards, smart cards, etc. A payment device may be an example of a user device.

DETAILED DESCRIPTION

Resource providers create profiles for different types of purchases. Profiles can include, for example, "Overnight shipping and greater than $1000," "Digital goods" "High Dollar" "Low Dollar," "Public Standard Risk," "Buy online, Store pickup greater than $300." etc. These are merely examples and many profiles for different types of purchases can be created. Profiles can vary per resource provider and can vary based on the types of resources provided by the resource provider.

For each of the profiles, one or more rules can be created. A rule can include parameters that when met, will trigger the rule. A rule can be generated specific to a particular type of fraud, such as a cyberattack, that the resource provider would like to prevent. For example, a profile of "digital codes" can include rules such as "Auth issues," "Low Dollar Attack" and "Fraud Reg 2." These are merely examples, and different rules can be created as desired by the user. Specifically, rules can be created based on the activity that the resource provider would like to identify.

A rule can be created that is used only for a particular profile or a rule can be created that is used among several different profiles. A library of rules can be created and a profile can include links to the rules. The library can include a varying number of rules depending on the user. For example, a library can include a hundred rules or a thousand rules. That is, a profile can be created that includes links to one or more rules that are stored in a rules library. Further, the results from the rule evaluation can be associated with or attached to the profile.

A particular rule may appear in different profiles. For example, Rule A may be used in a first profile and in a second profile. Further, multiple rules may perform a same function in a profile. For example, a Rule A and a Rule B may exist in a first profile and Rule A and Rule B may perform similar functions. Resource providers may add new rules without determining whether an existing rule can perform the same function.

It can be cumbersome for a resource provider to manually review all of their rules to determine whether rules in a profile perform a same function. Therefore, the resource security system may have redundant rules that are not needed. Performance of the resource security system can be affected by having redundant rules that can result in discrepancies. Conflicts among rules or complex rules within a profile can result in slow down of the resource security system. Further, redundant rules result in increased storage use and slow down processing capabilities of the system.

It can also be very difficult to determine which rules should be removed for which profiles and which rules should remain in system since redundant rules can vary from profile to profile.

Over time, the rules that are generated and stored may be duplicative. Therefore, example embodiments provide techniques for determining which rules are redundant. Example embodiments can also provide recommendations for redundant rules. The user can be notified as to which rules should be evaluated. Alternatively, the system can independently determine which rules are duplicative and the actions that should be performed on duplicate rules.

I. Resource Security System

A resource security system may be used to grant or deny access to resources. In addition, the resource security system may implement access rules to reject access requests having parameters indicative of fraud. For purposes of brevity, an access rule may also be called a rule in the description. The resource security system may evaluate the performance of the access rules based on reports of fraudulent access. The resource security system may determine whether the rules are used and whether the rules continue to be applicable to the system. If a rule is not used, then the resource security system can determine whether the rule should be removed from the system.

A resource security system may receive requests to access a resource. The resource security system may include an access server for determining an outcome for the access request based on access rules. The resource security system may also include an access rule generation system for generating and selecting the access rules. The resource security system is described in further detail below.

A. Resource Security System for Securing Access to a Resource

FIG. 1 shows a resource security system 100 for authorizing access to resources, in accordance with some example embodiments. The resource security system 100 may be used to provide authorized users access to a resource while denying access to unauthorized users. In addition, the resource security system 100 may be used to deny fraudulent access requests that appear to be legitimate access requests of authorized users. The resource security system 100 may implement access rules to identify fraudulent access requests based on parameters of the access request. The access rules may be selected based on their performance and their stability over time.

The resource security system 100 can include a resource computer 110. The resource computer 110 may control access to a physical resource 118, such as a building or a lockbox, or an electronic resource 116, such as a local computer account, digital files or documents, a network database, an email inbox, a payment account, or a website login. The resource computer 110 may be controlled by a resource computer user 111. In some embodiments, the resource computer may be a webserver, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). The access request can be received in real time. In some embodiments, the request computer 170 may be a service provider that is different from the resource provider.

The access device 160 and the user device 150 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 170 may send an access request to the resource computer 110 along with one or more parameters of the access request. The access request may include the authorization information provided by the user 140.

In one example, the user 140 may enter one or more of an account number, a personal identification number, and password into the access device 160, to request access to a physical resource (e.g., to open a locked security door in order to access a building or a lockbox) and the request computer 170 may generate and send an access request to the resource computer 110 to request access to the resource. In another example, the user 140 may operate the user device 150 to request that the resource computer 110 provide access to the electronic resource 116 (e.g., a website or a file) that is hosted by the resource computer 110. In another example, the user device 150 may send an access request (e.g., an email) to the resource computer 110 (e.g., an email server) in order to provide data to the electronic resource 116 (e.g., deliver the email to an inbox). In another example, the user 140 may provide an account number and/or a personal identification number to an access device 160 in order to request access to a resource (e.g., a payment account) for conducting a transaction.

In some embodiments, the resource computer 110 may verify the authorization information of the access request based on information stored at the request computer 170. In other embodiments, the request computer 170 may verify the authorization information of the access request based on information stored at the resource computer 110.

The resource computer 110 may receive the request substantially in real-time (e.g., account for delays computer processing and electronic communication). Once the access request is received, the resource computer 110 may determine parameters of the access request. In some embodiments, the parameters may be provided by the user device 150 or the request computer 170. For example, the parameters may include one or more of: a time that the access request was received, a day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

While the access request may include proper authentication information, the resource computer may send the parameters of the access request to the access server 120 in order to determine whether the access request is fraudulent. The access server 120 may store one or more access rules in an access rules library 122 for identifying a fraudulent access request. Each of the access rules in the access rules library 122 may include one or more conditions corresponding to one or more parameters of the access request.

The access server 120 may determine an access request outcome indicating whether the access request should be accepted (e.g., access to the resource granted), rejected (e.g., access to the resource denied), or reviewed by comparing the access rules in the access rules library 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send the indication of the access request outcome to the resource computer 110 (e.g., accept, reject, or review). In some embodiments, the access server 120 may send the evaluation score to the resource computer 110 instead. The resource computer 110 may then grant or deny access to the resource based on the indication of the access request outcome or based on the evaluation score. The resource computer 110 may also initiate a review process for the access request.

In some embodiments, the access server 120 may be remotely accessed by a user. The access server 120 may store data in a secure environment and implement user privileges and user role management for accessing different types of stored data. For example, user privileges may be set to enable users to perform one or more of the following operations: view logs of received access request, view logs of access request outcomes, enable or disable the execution of the access rules in the access rules library 122, update or modify the access rules in the access rules library 122, change certain access request outcomes. Different privileges may be set for different users.

The resource computer 110 may store access request information for each access requests that it receives. The access request information may include the parameters of each of the access requests. The access request information may also include an indication of the access request outcome for the access request. The resource computer 110 may also store validity information corresponding to each access request. The validity information for an access request may be initially based on its access request outcome. The validity information may be updated based on whether the access request is reported to be fraudulent. In some embodiments, the access server 120 or the request computer 170 may store the access request information and the validity information.

The access server 120 may include a janitor computer 180. The janitor computer can be a computing device is that used to identify the rate of use of the access rules in the access rules library 122. The janitor computer can generate a report to assist a user in determining the usage rate of rules. The janitor computer 180 can provide recommendations for the handling of redundant access rules.

The janitor computer 180 can include a redundant rule subsystem 510 for determining rule redundancy. In an example embodiment, redundancy is determined for rules that are resulting in a "reject" outcome. However, redundancy can also be determined for access requests having "accept" or "review" outcomes. The janitor computer is explained in greater detail below.

B. Janitor Computer

The resource security system 100 allows a resource provider to create rule profiles and specify criteria for when a specific rule profile is to be selected. Once a rule profile is selected for a given transaction, each of the specific access rules within the profile may or may not be triggered based on the particular transaction data. Based on which access rules of the profile are triggered, the user can decide to accept/keep, delete/remove or update/check a rule.

The access rules in access rules library 122 can be implemented by the access server 120 and may be generated by an access rule generation system 130. The access rule generation system 130 may generate candidate access rules 134 for the access server 120 based on the access request information and the validity information. The access rule generation system 130 may receive the access request information and the validity information corresponding to the access request information from the resource computer 110 or the access server 120. The access rules in the access rules library 122 implemented by the access server 120 may include some or all of the candidate access rules 134. An access rule can be re-used among rule profiles.

The janitor computer 180 is configured to perform realtime processing of the access rules. The janitor computer can provide a report to the resource computer 110. The report can be presented on a display of a user interface. A user, such as the resource computer user 111, can determine whether one or more access rules are duplicative and should be maintained in the resource security system 100.

The janitor computer 180 can include a data store 181 for storing data, such as profile information, for evaluation. The data store 181 can also store rule information, such as links to rules that are stored in the access rules library 122. The janitor computer 180 can also include a redundant rule subsystem 510. The redundant rule subsystem 510 can determine whether one or more rules are redundant.

Figure 2:
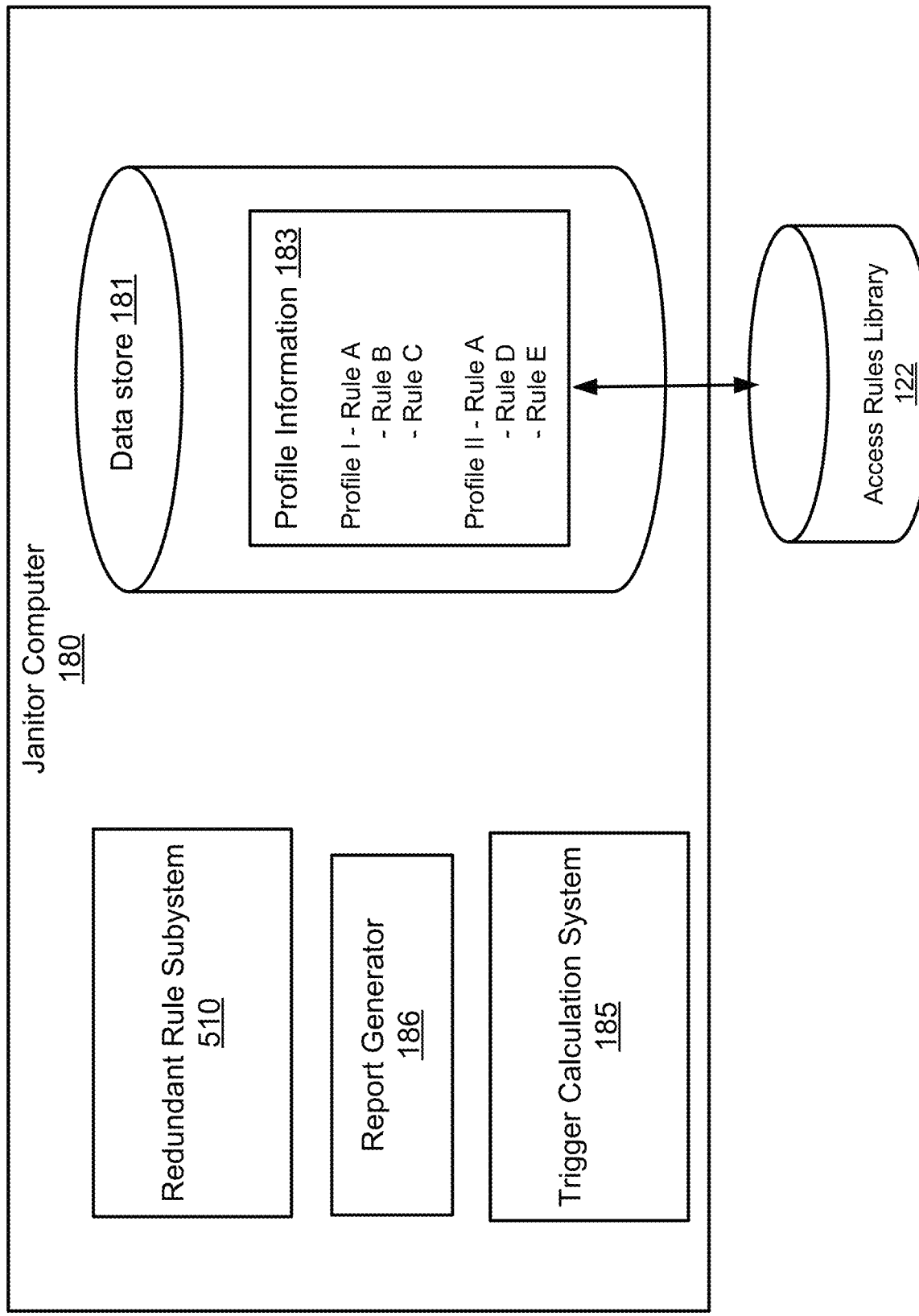
FIG. 2 shows a functional block diagram of the janitor computer, in accordance with some example embodiments.

FIG. 2 shows a functional block diagram of the janitor computer 180, in accordance with some example embodiments.

As shown in FIG. 2, the janitor computer 180 can include a data store 181, a trigger calculation system 185 and a report generator 186. The data store 181 can store profile information 183. The data store 181 can access rules that are obtained from the access rules library 122. For example, the data store 181 can store links to access rules that are stored in the access rules library 122 or other information that identifies the access rules.

A rule can route you to the associated profile. A rule profile contain a set of rules that are used to make decision regarding transactions having certain characteristics. For example, a debit card profile could handle all transactions from debit cards, a gift card profile could handle all transactions from gift cards, and a cross border profile could handle all cross-border transactions.

A plurality of access rules can be stored in the access rules library 122. Each of the plurality of access rules can include one or more parameters for triggering each of the access rules. The resource provider, for example, can create the access rules library 122 and rules in the library can be reused for different profiles.

The redundant rule subsystem 510 can be used to determine whether one or more rules in a profile are redundant. The redundant rule subsystem 510 is explained in more detail with respect to FIG. 26.

The trigger calculation system 185 can be used to determine whether a rule in a profile continues to be triggered. A trigger calculation system can determine whether a rule is triggering for a particular transaction. A count can be maintained for each rule and the count can be incremented for a rule each time the rule is triggered for a transaction.

The report generator 186 can generate a report for the one or more rules in one or more profiles. The report that is generated can vary based on the data desired by the user. A report that can be generated by the report generator 186 is explained in greater detail with respect to FIG. 28. The report can be used by the user to easily and quickly determine whether or not a rule is redundant and how to address redundant rules.

The report can be provided on an interactive user interface. Therefore, the user can easily manipulate the report results. That is, a user can quickly and easily identify rules that are redundant. The report can indicate whether rules should be consolidated, monitored, or removed. Further, the rules can be removed in an efficient manner.

II. Co-Triggering of Access Rules

Figure 3A:
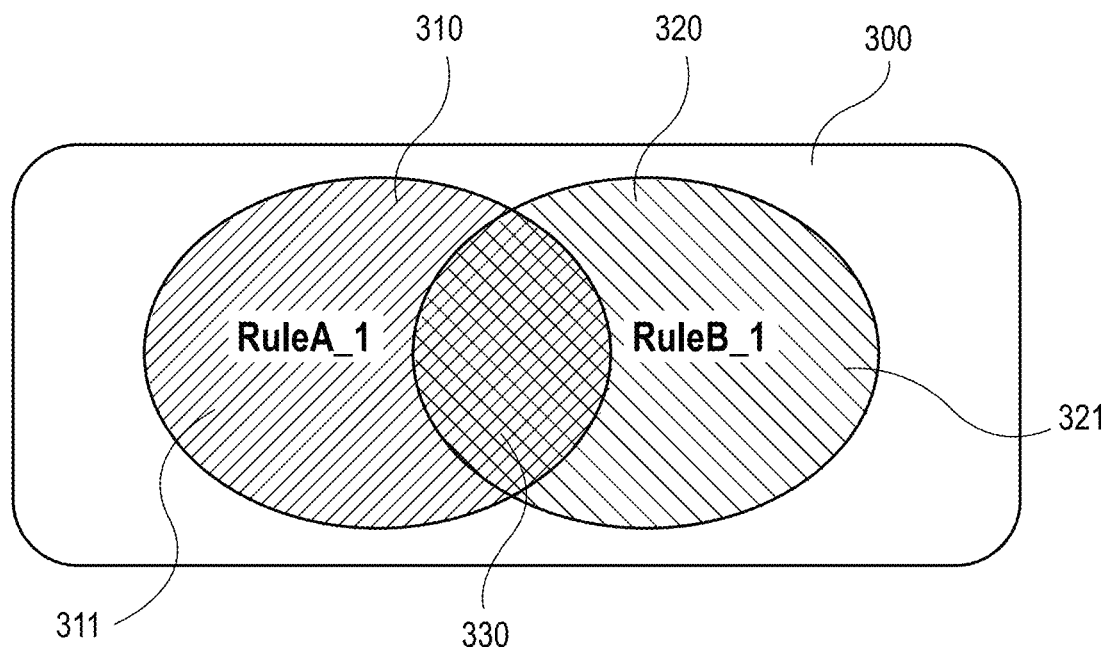
FIG. 3A illustrates a diagram of overlapping access rules, in accordance with some example embodiments.

FIG. 3A illustrates a diagram 300 of overlapping access rules 310 and 320, in accordance with some example embodiments. As shown in FIG. 3A, a Rule A 310 and Rule B 320 do not have identical conditions, as shown in the non-overlapping areas 311 and 321.

However, there may be instances in which Rule A and Rule B have identical conditions, as shown in overlapping area 330. In the instances in which Rule A and Rule B overlap, both Rule A and Rule B can be triggered when certain conditions are met.

In the scenario shown in FIG. 3A, in some situations, both rules can be triggered. Therefore, in certain situations Rule A 310 and Rule B 320 are redundant. Therefore, in the situation shown in FIG. 3A, the rules can be evaluated for redundancy and the rule having a weaker performance level can be removed.

A rule's performance can be simplified to three performance levels: High, Moderate, and Low. As disclosed in example embodiment, evaluation of rule redundancy can be based on a rule's performance level. Table 1 below illustrates possible performance level combinations for two overlapping rules.

TABLE 1

| Possible combinations of performance levels when a pair of rules are co-triggering. | |
|---|---|
| Rule_A | Rule_B |
| High | High |
| High | Moderate |
| High | Low |
| Moderate | High |
| Moderate | Moderate |
| Moderate | Low |
| Low | High |
| Low | Moderate |
| Low | Low |

Figure 3B:
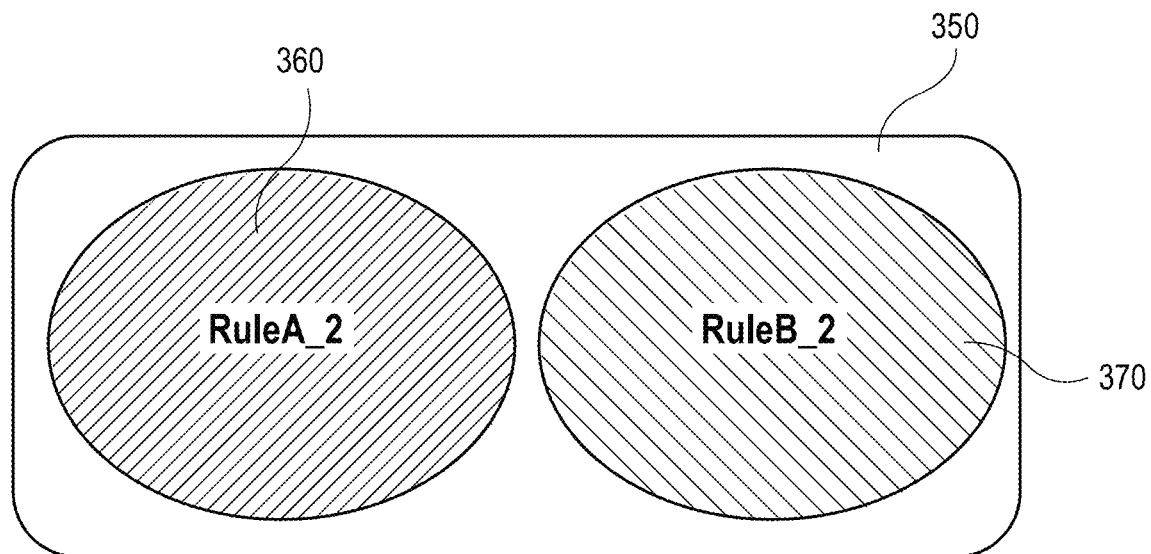
FIG. 3B illustrates a diagram of disjointed access rules, in accordance with some example embodiments.

FIG. 3B illustrates a diagram 350 of disjointed access rules 360 and 370, in accordance with some example embodiments. As shown in FIG. 3B, Rule A 360 and Rule B 370 do not have any overlapping conditions. That is, there is no area in which Rule A 360 and Rule B 370 have overlapping conditions, and therefore Rule A 360 and Rule B 370 would not both be triggered at a same time.

In this scenario shown in FIG. 3B, Rule A 360 and Rule B 370 do not overlap. For rules that fall under a disjoint scenario, if performance of the rules are decayed, that is, results are yielding a lot of false positives, then rule may be made passive or the rule may be removed.

Figure 4:
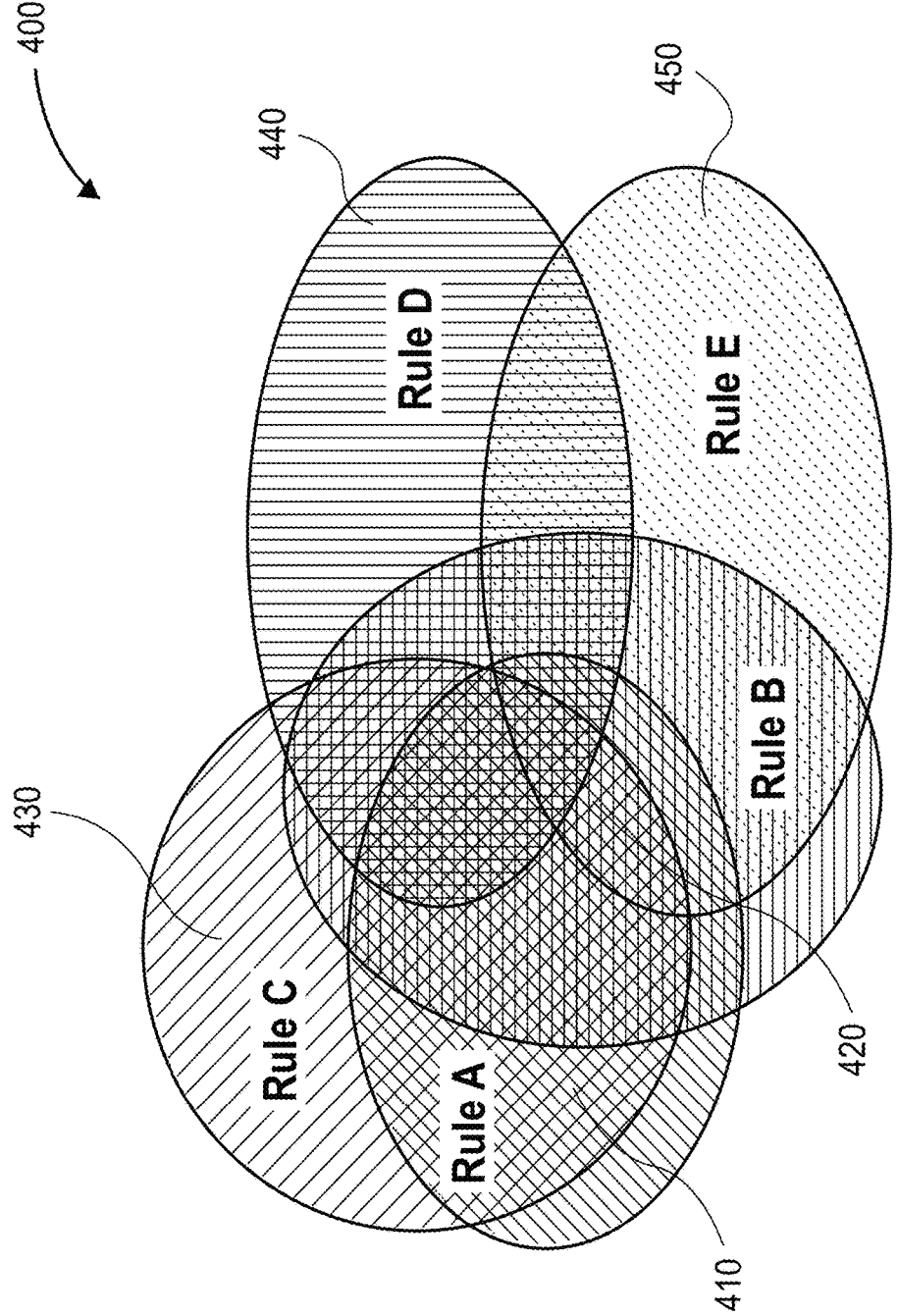
FIG. 4 illustrates a diagram of overlapping access rules, in accordance with some example embodiments.

FIG. 4 illustrates a diagram 400 of overlapping access rules, in accordance with some example embodiments. As shown in FIG. 4, there can be many rules 410, 420, 430, 440 and 450 that overlap. Further, the rules can overlap in varying degrees.

Rules are often evaluated based on pairs of rules. That is, a first rule is compared with a second rule to determine redundancy. When there are N rules, there will be "N*(N−1)/2" pair of rules need to be evaluated. When there are more than a pair of rules (e.g., tens of rules, hundreds of rules, etc.) iteratively searching all possible pair of rules' co-triggering pattern to determine potential redundancy is not efficient.

Further, one rule could overlap with multiple rules. For example, it can be determined that the overlapping rules are acting on a subset of transaction with certain similarities. It can be difficult to identify how all of the rules are overlapping with each other. All of the possible combinations of how three rules could overlap, how four rules could possibly overlap, how five rules could possibly overlap, etc. would need to be performed. This would be a time consuming and inefficient process.

For example, if rule A 410 is being analyzed and rule A 410 has a moderate performance level, if rule B 420, rule C 430, rule D 440, and rule E 450 all overlap with rule A, it is highly likely that rule B 420, rule C 430, rule D 440, and rule E 450 will also overlap with each other.

A way of determining which rules overlap would be to explore all possible disjoint segments formed by the five rules, evaluate the performances of those rule formed segments one by one, to collect those weak performed ones, good performed ones, and then make decisions on which piece to set to monitor, to remove, or to keep. However, it can be difficult to determine which rules are overlapping. Further, five rules are shown in the example, however, there may be hundreds of different overlapping rules. It would be an extremely inefficient and time consuming processing to evaluate rule performance for each segment.

An example embodiment provides a cluster-modeling method. The cluster-modeling method is a type of unsupervised learning method. Transactions, which tend to trigger a subset of rules, are clustered together.

The clustering would yield groupings of transactions. For example, cluster_1 of transactions may trigger a subset of rules {S_1} more often than other transactions, cluster_2 of transactions trigger another subset of rules {S_2} more often than other transactions, and cluster_n of transactions may trigger a subset of rules {S_n} more often than other transactions. In addition, subsets of rules {S_1}, {S_2}, and {S_n} are mutually exclusive to each other.

An example embodiment provides for searching within each cluster. That is, a search is performed for a first cluster, a second cluster, etc. Within a cluster, overlapping patterns of the subset of rules for that cluster are evaluated. Determining co-triggering patterns can be performed for the subset of rules for the cluster. Therefore, evaluating co-triggering patterns involves less work since it is performed for the subset of rules for that cluster.

Further, since a cluster includes a subset of rules, when a subset of rules tend to co-trigger for a cluster of transactions, it is easier to identify rules that are co-triggering or overlapping.

Further, for each rule in the subset of rules for the cluster, the triggering percentage of that rule for a cluster of transactions can be determined. For example, if a triggering percentage of a rule is high for a particular cluster of transactions, it can be more easily determined if the rule should be evaluated.

III. System for Managing Redundant Access Rules

Figure 5:
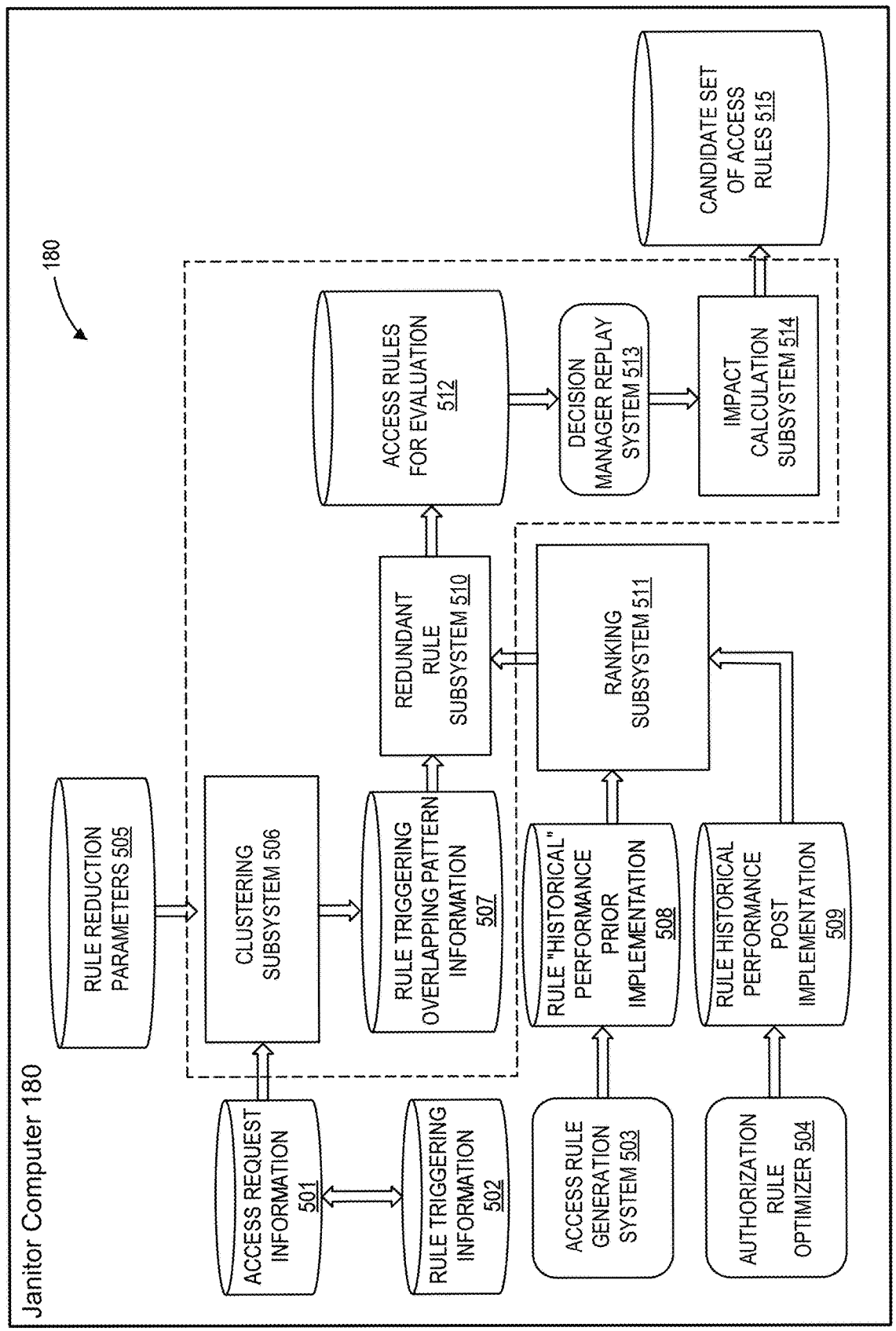
FIG. 5 illustrates a diagram of the janitor computer for managing redundant access rules, in accordance with some example embodiments.

FIG. 5 illustrates the janitor computer 180 for managing redundant access rules, in accordance with some example embodiments.

The janitor computer 180 can include elements 501-515. The janitor computer 180 can also be known as a rule janitor computer. In the example shown in FIG. 5, the elements 501-515 are located within janitor computer 180, however, one or more of the elements can be external to or separate from the janitor computer 180. For example, access rule generation system 503, authorization rule optimizer 504 and decision manager replay system 513 can be external to the rule janitor computer 180.

The janitor computer 180 can include a plurality of data stores. For example, the janitor computer 180 can include access request information data store 501, rule triggering information data store 502, rule reduction parameters data store 505, rule triggering overlapping pattern information data store 507, rule historical performance prior implementation data store 508, rule historical performance post implementation data store 509, sets of access rules data store 512, and candidate set of access rules data store 515.

Access request information data store 501 can store access requests. Cluster modeling can be applied to data obtained from access request information data store 501. Rule triggering information data store 502 can store access requests and their associated rule triggering information.

Rule reduction parameters are configurable parameters that can be stored in rule reductions parameters data store 505. Rule reduction parameters stored in the rule reductions parameters data store 505 can include a minimum number of rules to be removed/setting the system to surveillance mode, a maximum percent of rejection reduction, a selected rule profile, and a date and time interval. The rule reduction parameters can be set by a user or default configurations can be used.

Rule triggering overlapping pattern information data store 507 can store information regarding how many times a rule is triggering in each TRTPC. Rule historical performance prior implementation data store 508 can store information regarding a rule's performance prior to implementation. Rule historical performance post implementation data store 509 can store information regarding a rule's performance post implementation.

The sets of access rules in sets of access rules data store 512 can include access rules that will possibly be added, removed, or monitored. That is, the access rules to be evaluated. The candidate set of access rules in candidate set of access rules data store 515 can include access rules to be added, removed, or monitored. That is, the access rules that are determined to be candidates for adding, removing or monitoring.

If rules are removed or if rules are set to surveillance mode, a total rejection rate my decrease. A maximum percent of rejection reduction is a parameter to control the maximum decrement percent of rejection allowed, after a rule has been removed. For example, if a current profile total rejection rate is 10%, the maximum percent of rejection reduction can be set to 8%. Therefore, for some rules, after removal or if the rule enters into surveillance mode, the profile total rejection rate should remain to a level at 10%*(100%−8%)=9.2% or higher.

The selected rule provide is the profile that the user would like to work on. The data time interval is a time interval during which transactions to be clustered are identified.

A rule's mode can include prevention, surveillance and monitoring, or removal. In the prevention mode, if a rule is triggered, the rule trigger indicator will be "1" and it will yield a rejection. If the rule's mode is surveillance and monitoring, if the rule is triggered, the rule trigger indicator will be '1' and it will not yield a reject result. If the rule's mode is removal, the rule can be removed from rule profiles. It will no longer have impact on the system.

The janitor computer 180 can also include access rule generation system 503, authorization rule optimizer 504, clustering subsystem 506, redundant rule subsystem 510, ranking subsystem 511, decision manager replay system 513, impact calculation subsystem 514.

An access rule generation system 503 is described in detail in U.S. Pat. No. 9,853,993 issued Dec. 26, 2017 titled "Systems And Methods For Generation And Selection Of Access Rules," which is incorporated herein by reference in its entirety for all purposes. An authorization rule optimizer 504 is described in detail in U.S. Pat. No. 10,333,982 issued Jun. 25, 2019 titled "Rotation Of Authorization Rules In Memory Of Authorization System," which is incorporated herein by reference in its entirety for all purposes.

Clustering subsystem 506 can cluster requests that trigger a similar set of access rules. Ranking subsystem 511 can determine a pre-implementation performance rank and a post-implementation performance rank for a rule. The pre-implementation performance rank and a post-implementation performance rank is a numeral value representing the ranking of the access rule in relation to other access rules that are being triggered. Impact calculation subsystem 514 can calculate an impact of adding or removing a rule. The impact calculation subsystem 514 can evaluate the impact on overall rejection rate if rules are removed or consolidated.

The redundant rule subsystem 510 can obtain information from rule triggering overlapping pattern information data store 507 to determine how often a rule is triggering for each Transaction Rule Triggering Pattern Cluster (TRTPC). The redundant rule subsystem 510 can determine, based on the information obtained from rule triggering overlapping pattern information data store 507, regarding a TRTPC's volume, rule union trigger counts, and over trigger percent. Operation of the redundant rule subsystem 510 of the janitor computer 180 is explained in greater detail with respect to FIG. 6.

Ranking subsystem 511 can use information stored in the rule historical performance prior implementation data store 508 in order to rank a rule's prior to implementation performance. Ranking subsystem 511 can use information stored in rule historical performance post implementation data store 509 in order to rank a rule's post implementation performance Decision manager replay system 513 can replay a rule profile. After rules are consolidated, a rule profile associated with the consolidated rules can be replayed in the impact calculation subsystem 514 and a total profile rejection rate can be calculated. After a first rule that is selected for removal is removed and the rule profile is replayed, a total profile reject rate and cumulative impact of reduced percent of reject rate is calculated.

After a second rule that is selected for removal is removed and the rule profile is replayed without the first and second rules that are removed, a total profile reject rate and cumulative impact of reduced percent of reject rate is calculated. This process can be repeated for all rules that are identified for removal.

The janitor computer 180 is configured to operate independently without requiring user intervention to determine redundant rules.

IV. Method for Managing Redundant Access Rules

Figure 6:
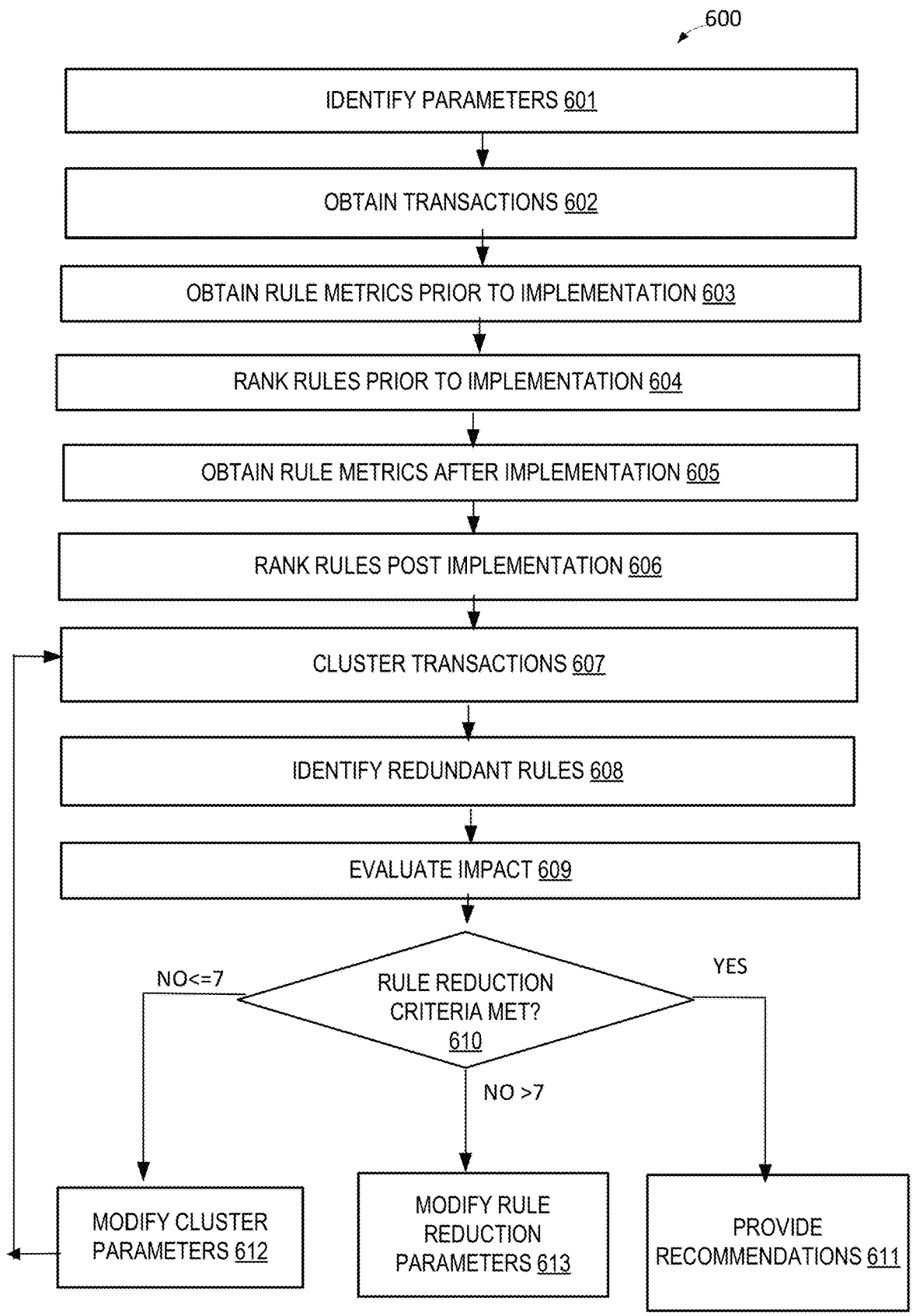
FIG. 6 illustrates a flowchart of a method for managing redundant access rules, in accordance with some example embodiments.

FIG. 6 illustrates a flowchart of a method 600 for managing redundant access rules, in accordance with some example embodiments. FIG. 6 includes steps 601 to 612.

At step 601, a request can be received to identify redundant rules. A resource provider, such as a merchant, can specify rule reduction parameters in the request. If a resource provider does not specify rule reduction parameters, then default configurations can be used. The rule reduction parameters can be received from the rule reductions parameters data store 505.

Parameters for identifying redundant rules can include a minimum number of rules to be removed/setting the system to surveillance mode, a maximum percent of rejection reduction, a selected rule profile, and a date and time interval.

Example parameters can be set to the following: Min Number of Rules To Be Removed/Set to Surveillance Mode: 10; Max Percent of Rejection Reduction: 2%; Selected Rule Profile: The XYZ Profile contains 70 real rules; and Data Time Interval: DD1/MM1/YYYY1-DD2/MM2/YYYY2. This is merely an example, and the parameters can be modified based on the needs of the user.

At step 602, transactions and rules associated with the transactions are retrieved. The transactions can be historical transactions. The transactions that are retrieved can be transactions associated with rules that are being evaluated. The rules associated with the historical transactions are rules in a selected profile. The transactions with rules and the triggering indicators for the rules can be retrieved from access request information data store 501 and rule triggering information data store 502. The transactions that are retrieved can correspond the parameters (e.g., data and time parameters) that were input in step 601 or based on a default configuration.

The rules include triggering indicators. A rule trigger indicator can be provided for each transaction. A Boolean variable is given for each rule. If the rule triggered for a transaction, the rule is given a rule trigger indicator '1', and if a rule is not triggered for a transaction, then the rule is given a rule trigger indicator of '0'.

FIG. 7 illustrates a table 700 comprising rules and indicator values, in accordance with some example embodiments. FIG. 7 provides a view of the raw data on transactions' rule trigger indicator. FIG. 7 illustrates rule trigger indicators on a sample of transactions. The results shown in FIG. 7 can appear after step 602 of FIG. 6.

At step 603, rule metrics prior to implementation are obtained. Rule metrics prior to implementation can be obtained from rule historical performance prior implementation data store 508. A performance metric of a rule is generated when the rule has been trained and tested prior to implementation. The access rules performance log prior to implementation can be generated by access rule generation system 503.

At step 604, ranking of rules prior to implementation is performed. Rule performance is ranked based on prior implementation performance metrics. The ranking describes the rule's performance metric in nominal levels. Ranking of the rules can be performed by ranking subsystem 511 based on data obtained from rule historical performance prior implementation data store 508.

At step 605, rule metrics after implementation are obtained. A performance metric of a rule is obtained after the rule has been implemented. The access rules performance log that is post implementation can be obtained from rule historical performance post implementation data store 509. Authorization rule optimizer 504 can generate the access rules performance log for performance post implementation, and provide the log to rule historical performance post implementation data store 509.

At step 606, ranking of the rules after implementation is performed. Post implementation performance metrics are generated after a rule has been implemented. A rule's performance is based on post implementation performance metrics. The ranking describes the rule performance metric in nominal levels.

At step 607, a co-triggering pattern is modeled for transactions. The co-triggering pattern modeling can include cluster modeling. Transaction clusters can be constructed for the transactions. Within each cluster, it can be determined which transactions tend to trigger a set of rules more often than other clusters of transactions. The generation of clusters is explained in greater detail with respect to FIG. 8.

At step 608, one or more sets of rules that may be redundant are determined. Removable rules are identified. Overlapping rules can be consolidated. The determination of redundant rules is explained in greater detail with respect to FIG. 25.

At step 609, the impact on the rejection rate is evaluated. An impact on overall access request rejection rate is evaluated as if the potential redundant rules can be removed and the consolidated rules are added. Therefore, access requests can be processed as if, for example, access rules are consolidated or removed. The potentially redundant rules can be temporarily removed or consolidated until the impact of the action is determined.

This step can be performed by decision manager replay system 513. The decision manager replay system 513 can evaluate the impact on overall rejection rate as if redundant rules were removed or as if rules were consolidated. After a first rule that is selected for removal is removed and the rule profile is replayed, a total profile reject rate and cumulative impact of reduced percent of reject rate is calculated. Based on the impact, the cluster modeling parameters can be adjusted. For example, a parameter such as number of transaction clusters can be adjusted.

At step 610, it is determined whether the rule reduction criteria that was received in step 601 is met.

If the rule reduction criteria is met, at step 611, recommendations can be provided. The recommendations can include a list of redundant rules. The list of redundant rules an include descriptions of the rule's performance, impact if the rule is moved out of prevention mode, and corresponding actions, such as surveillance or remove.

A summary of the information can be provided to resource providers. The resource providers can be provided with a report and the resource providers can make decisions about rules based on the report. Alternatively, based on a history of information, the janitor computer can independently and automatically determine which rules should be removed.

If the rule reduction criteria is not met at step 610, then the method can proceed to step 612 or 613. If the rule reduction criteria is not met and it is within a pre-determined number of attempts (e.g., within less than 7 attempts), at step 612 the clustering parameters can be modified. Specifically, the clustering parameters can be auto-tuned by the system. The number of clusters on the transaction rule triggering pattern cluster (TRTPC) can be increased or reduced. After auto-tuning the clustering parameters, the method can return to step 607, and the process is repeated for the auto-tuned clustering parameters.

If the rule reduction criteria has not been met and it is on or after a pre-determined number of attempts (e.g., on or after 7 or more attempts), at step 613, the loop of tuning the clustering model for TRTPC can end. The user can be notified that the criteria has not been met and that the rule reduction parameters need to be adjusted. Alternatively, the user can be notified that further consultation is needed regarding the parameters being used.

A. Cluster Modeling

Figure 8:
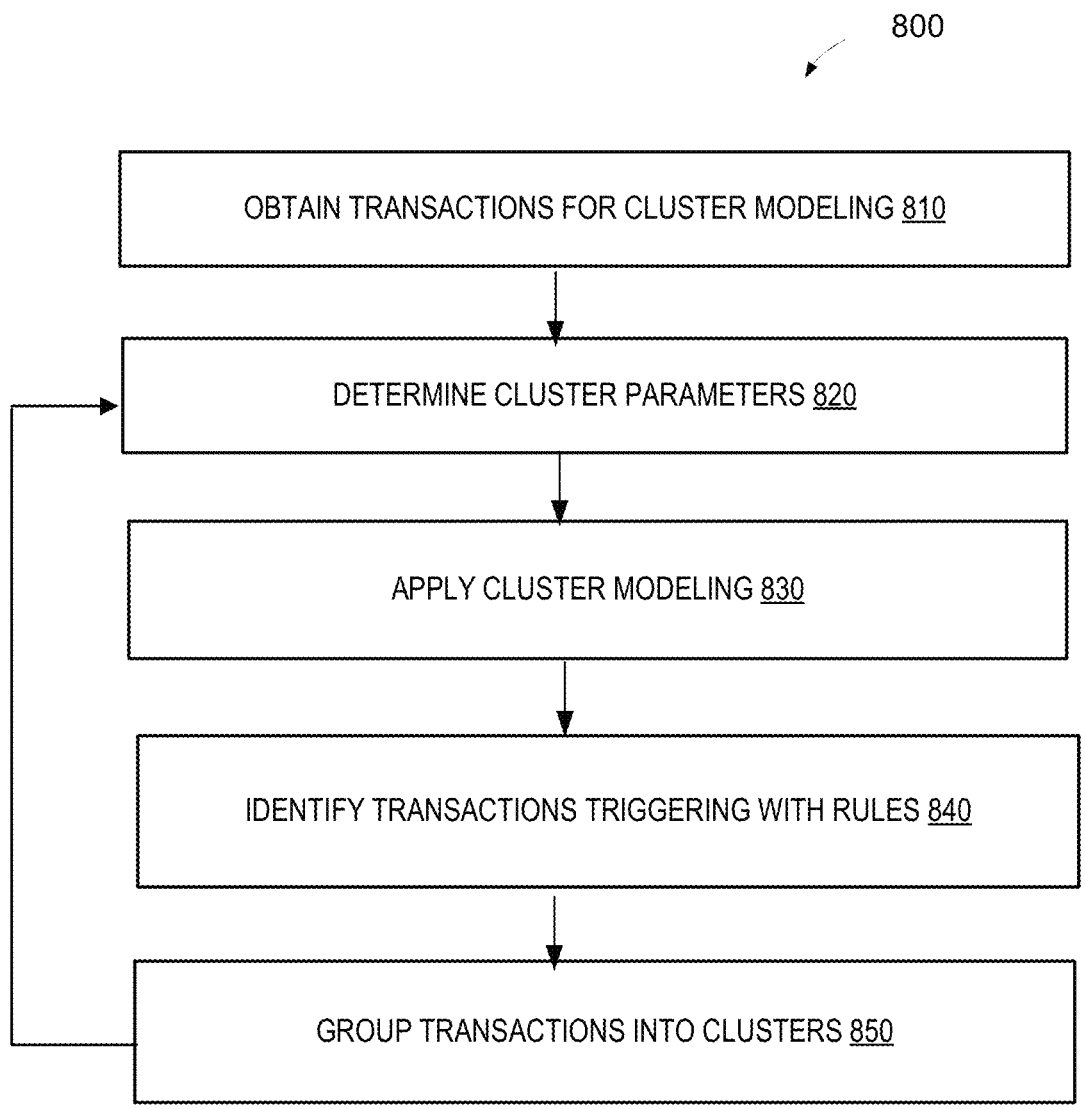
FIG. 8 illustrates a method of generating transaction clusters, in accordance with some example embodiments.

FIG. 8 illustrates a method of generating transaction clusters, in accordance with some example embodiments. The clustering can be performed by clustering subsystem 506 of FIG. 5. Cluster modeling can be used to determine a co-triggering pattern of rules among numerous transactions.

Figure 9:
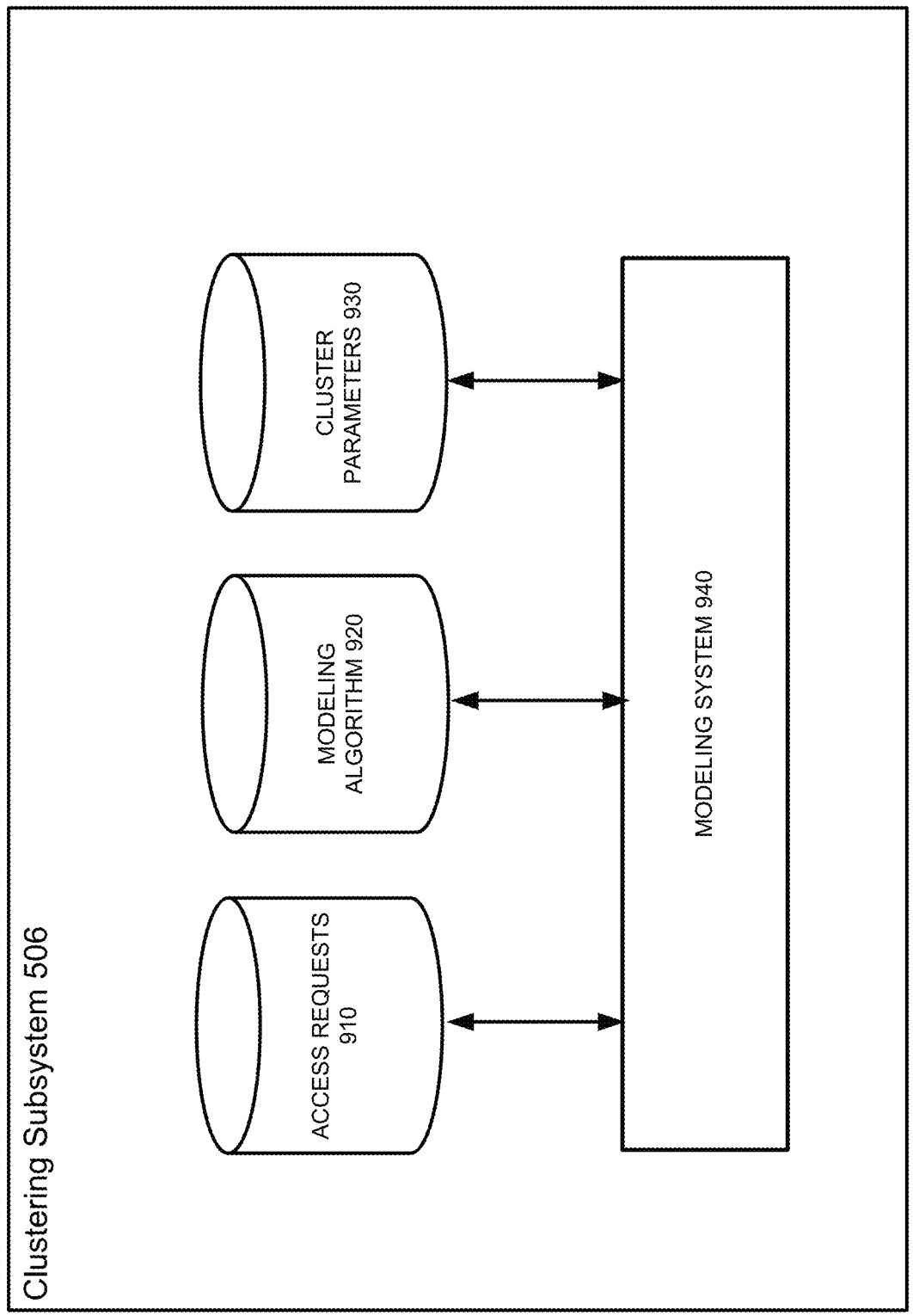
FIG. 9 illustrates a clustering subsystem, in accordance with some example embodiments.

FIG. 9 illustrates a clustering subsystem 506, in accordance with some example embodiments.

Clustering subsystem 506 can include cluster data store 910, modeling algorithm data store 920, cluster parameters data store 930 and modeling system 940. Clustering subsystem 506 can apply clustering modeling algorithms, like K-Means, on the data retrieved from access request information data store 501 and rule triggering information data store 502. The access request information and rule triggering information can be stored in cluster data store 910. The cluster modeling can be performed by modeling system 940 of clustering subsystem 506. Transactions with similar Transaction Rule Triggering Patterns (TRTP) can be grouped into clusters to form the Transaction Rule Triggering Pattern Clusters (TRTPC) for each transaction.

For a given set of transactions, modeling is performed on the Transaction Rule Triggering Pattern (TRTP) to cluster the transactions into different clusters. For one transaction, TRTP is a vector recording which rules the transaction triggered. For example, if there are 15 rules (e.g., R-1-R15), each of the rules would have a TRTP vector of "0" or "1" based on whether a transaction triggered a rule. The cluster of transactions have a similar Transaction Rule Triggering Pattern.

At step 810, the transactions to be clustered are obtained. The transactions correspond to the rules that are being evaluated for redundancy. That is, the obtained transactions trigger rules that are being evaluated.

At step 820, clustering parameters are obtained. Clustering parameters can include, for example, a number of desired clusters. The number of clusters can be a predetermined number or the number of clusters can vary depending on the results desired by the user. The clustering parameters can be modified if desired results are not obtained.

At step 830, cluster modeling can be applied to the transactions. Cluster modeling can include applying a cluster modeling algorithm, such as K-means clustering.

At step 840, transactions that are triggering within a subset of rules are identified.

At step 850, the transactions are grouped into clusters. The number of clusters is based on the cluster parameters input at step 820. The model will assign each transaction into one of the TRTPCs. Within each TRTPC, the transactions tend to trigger a subset of rules more frequently than in another TRTPC.

FIG. 10 illustrates a table 1000 of transactions with learned cluster labels and rule trigger indicators, in accordance with some example embodiments.

As shown in FIG. 10, seven Transaction Rule Triggering Patterns (TRTPC) are formed. Transactions t1-t8 have been grouped under TRTPC1, t9-t14 have been grouped under TRTPC2, t15-t21 have been grouped under TRTPC3, t22-t27 have been grouped under TRTPC4, t29-t35 have been grouped under TRTPC5, t36-t42 have been grouped under TRTPC6, and t43-t49 have been grouped under TRTPC7. In the example shown in FIG. 10, there are seven transactions in each cluster. FIG. 10 also shows what rules those transactions would trigger. There are 15 rules (Rule_1-Rule_15) and 49 (t1-t49) transactions are evaluated.

t1-t7 are clustered in to TRTPC1. These transactions triggered Rule_14 and Rule_15 more often than other transactions in other TRTPCs. t15-t21 are clustered in to TRTPC3. These transactions triggered Rule_1, Rule_2, and Rule_5 more often than other transactions in other TRTPCs. t29-t35 are clustered in to TRTPC5 since these transactions triggered Rule_3, Rule_6, Rule_9, and Rule_10 more often than other transactions in other TRTPCs. t43-t49 are clustered in to TRTPC7 since these transactions triggered Rule_11 and Rule_12 more often than other transactions in other TRTPCs.

The clusters shown in FIG. 10 are clusters of transactions. A number of clusters is a parameter that can be input in the cluster modeling algorithm (e.g., K-Mean Algorithm). The number of clusters can be auto-tuned. A possible searching range could be 3, 5, 6, 7, 11, 13, 17, 23, 29, etc. clusters. If seven is identified as the number of clusters on the transactions, if the determined redundant rules from seven clusters cannot meet the rule redundancy reduction parameters that are desired by the user, then the cluster parameters can be modified and the process can be repeated based on the new parameters. Therefore, if seven clusters does not satisfy the rule redundancy reduction parameters desired by the user, the cluster parameters can be modified (e.g., reduce to five clusters) until the rule redundancy reduction parameters are met or it is determined that the rule redundancy reduction parameters cannot be met.

The example shown in FIG. 10 applies the clustering of transactions based on emulated rules. In the example rule logic of FIG. 10, date and time parameters can include "MMMYYYY", such as "January 2020." The emulated rules logic for FIG. 10 can include the following rule logic:

```
IF condition_1 > 80 THEN Rule_1 = '1';
ELSE Rule_1 = '0';
IF condition_2 = 1 THEN Rule_2 = '1';
ELSE Rule_2 = '0';
IF condition_3 = 1 THEN Rule_3 = '1';
ELSE Rule_3 = '0';
IF condition_4 > 710 THEN Rule_4 = '1';
ELSE Rule_4 = '0';
IF condition_5 > 492 THEN Rule_5 = '1';
ELSE Rule_5 = '0';
IF condition_6 > 405 THEN Rule_6 = '1';
ELSE Rule_6 = '0';
IF condition_7 > 675 THEN Rule_7 = '1';
ELSE Rule_7 = '0';
IF condition_8 > 3 THEN Rule_8 = '1';
ELSE Rule_8 = '0';
IF condition_9 > 3 THEN Rule_9 = '1';
ELSE Rule_9 = '0';
IF condition_10 > 2 THEN Rule_10 = '1';
ELSE Rule_10 = '0';
IF condition_11 > 3 THEN Rule_11 = '1';
ELSE Rule_11 = '0';
IF condition_12 > 1 THEN Rule_12 = '1';
ELSE Rule_12 = '0 ';
IF condition_13 > 100 THEN Rule_13 = '1';
ELSE Rule_13 = '0';
IF condition_14 > 10 THEN Rule_14 = '1';
ELSE Rule_14 = '0';
IF condition_15 > 8 THEN Rule_15 = '1';
ELSE Rule_15 = '0';
```

B. Metrics

FIG. 11 illustrates a table 1100 of transaction counts in rules that are triggering, in accordance with some example embodiments. In the example shown in FIGS. 11-24, there are 70 rules and the triggering of the rules is sparse. The table shown in FIG. 11 includes fraud, legit, already rejected transaction counts in rules that are triggering. For a set of decision rules a rejection can be yielded. The counts shown in FIG. 11 are for each rule's triggering, on a testing data set, prior to implementation. The transactions shown in FIG. 11 can be a result of step 603 of FIG. 6.

FIG. 12 illustrates a table 1200 including rule performance metrics prior to implementation, in accordance with some example embodiments. The counts and measurements are based on applying rules on historical testing data set at a time prior to implementation. The counts and measurements shown in FIG. 12 are based on applying rules on historical testing data set at a time prior to implementation. The metrics shown in FIG. 12 can be a result of step 603 of FIG. 6.

A rule's performance measurements can include measurements such as triggering percent (TP): detect rate (DR), precision (PR) and overlap reject rate (ORR). Triggering Percent (TP) can indicate a percent of rule triggered counts or a total counts. Detect Rate (DR) can correspond to a rate of fraud counts in the rule triggered counts or total fraud counts. Precision (PR) can indicate fraud counts in the rule triggered counts or rule triggered counts. Overlap reject rate (ORR) can indicate that a rule is triggered and rule rejected counts or rule trigger counts.

FIG. 13 illustrates a table 1300 including rule performance metrics post implementation, in accordance with some example embodiment. Metrics can be calculated based on historical monitoring data. The metrics are calculated after the rule has been implemented (post rule implementation). The metrics shown in FIG. 13 can be a result of step 605 of FIG. 6.

As discussed above, at step 604, ranking of rules prior to implementation is performed. At step 606, ranking of rules after implementation is performed. In steps 604 and 606, the rule performance is ranked (prior and post implementation) based on metrics in order to determine how important the rule is.

An example of a ranking method could be weighted sum of the four measurements: triggering percent (TP): detect rate (DR), precision (PR) and overlap reject rate (ORR). If assigned:
Weight_DR=2.0
Weight_PR=3.0
Weight_OOR=0.5
Weight_TP=1.0

Prior_Perf_Rank=Weight_DR*DR+Weight_PR*PR+
Weight_OOR*(OOR*TP)+Weight_TP*TP

In the above example, weighted summation is used to perform ranking, however, other ranking mechanisms can be used.

The prior performance rank value indicates the importance of the rule. The higher the prior performance rank value, the more important the rule. Further, the higher the post-performance rank value, the more important the rule.

Overall_Perf_Rank can be defined as:

Overall_Perf_Rank=Weight_Prior_Perf_Rank*Prior_Perf_Rank+
Weight_Post_Perf_Rank*Post_Perf_Rank Where,
Weight_Prior_Perf_Rank=0.4
Weight_Post_Perf_Rank=0.6

FIG. 14 illustrates a table 1400 including rule performance rank prior to implementation, in accordance with some example embodiments. FIG. 15 illustrates a table 1500 including rule performance description prior to implementation, in accordance with some example embodiments. The classification on a rule's performance level of 'High', 'Moderate', 'Low' could be based on the distribution of all rules TR, DR, PR, 00R, respectively.

FIG. 16 illustrates a table 1600 including additional rule performance descriptions, prior to implementation, in accordance with some example embodiments. FIG. 17 illustrates a table 1700 including rule performance rank, after implementation, in accordance with some example embodiments.

Figure 18:
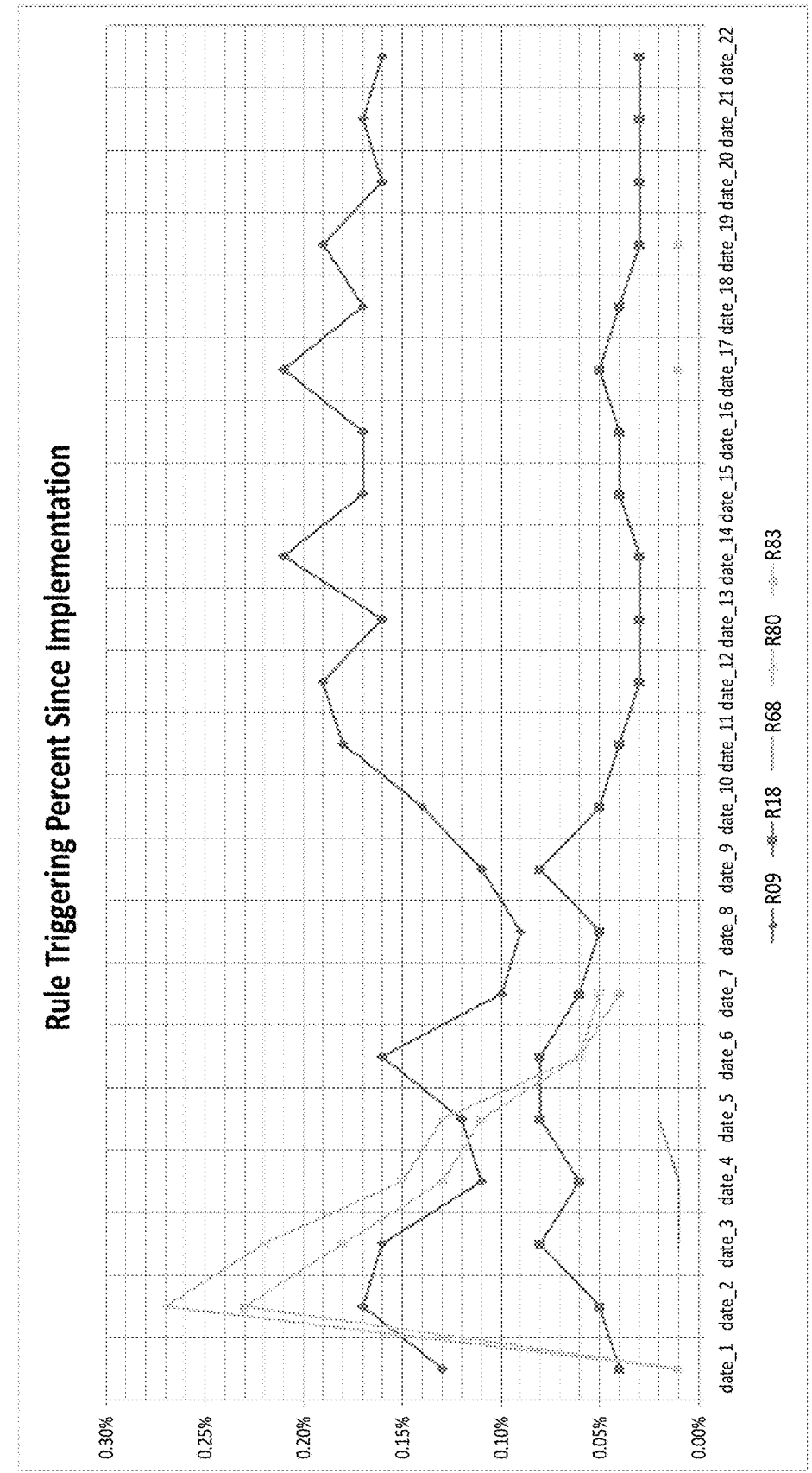
FIG. 18 illustrates a graph with rule triggering percentages, post implementation, in accordance with some example embodiments.

FIG. 18 illustrates a graph 1800 with rule triggering percentages, post implementation, in accordance with some example embodiments.

FIG. 19 illustrates a table 1900 including rule performance descriptions, after implementation, in accordance with some example embodiments. FIG. 20 illustrates an additional table 2000 including rule performance descriptions, after implementation, in accordance with some example embodiments FIG. 21 illustrates a table 2100 including transaction clusters, in accordance with some example embodiments. The transaction clusters are based on the triggering patterns of 70 rules. In the example shown in FIG. 21, six clusters are built up for all real transactions. The table shown in FIG. 21 summarizes the counts of each triggered rule in each TRTPC.

FIG. 22 illustrates a table 2200 displaying an over trigger percent for each TRTPC, in accordance with some example embodiments. In the example shown in FIG. 22, for TRTPC3, there are total 15 transactions in this cluster. However, rules are triggered 31 time for the 15 transactions. For each rejection decision, only one rejection rule needs to be triggered. The over trigger percent indicates that there are rules redundant to each other. Therefore, unnecessary rules may be reduced for this cluster.

Information stored in rule triggering overlapping pattern information data store 507 can be used to summarize the TRTPC's volume, Rule Union Trigger Counts, Rule Overlap Trigger Counts, and Over Trigger Percent.

For each TRTPC, an over trigger percent is defined as (TRTPC's Rule Trigger Overlap Count−TRTPC's Rule Trigger Union Count)/(TRTPC's Rule Trigger Union Count)−100%. The higher the over trigger percent, the more likely, there is rule redundancy issue in that TRTPC. If a transaction triggered any of the rules, the union count would be "1." The number of rules triggered by a transaction is the overlap count.

In FIG. 22, TRTPC4, TRTPC5, TRTPC3, and TRTPC2 are in an over triggering situation. This indicates that within each of these TRTPCs, a subset of rules that triggered within each of them have overlaps, and therefore, potential redundancy exists.

FIG. 23 illustrates a table 2300 including a rule trigger distribution for each TRTPC, in accordance with some example embodiments. FIG. 24 illustrates a table 2400 including a rule triggered coverage percent of each TRTPC, in accordance with some example embodiments.

The metrics shown in FIGS. 23 and 24 can be a result of step 608 of FIG. 6. At step 608, one or more sets of rules that may be redundant are determined. Removable rules are identified. Overlapping rules are consolidated.

As shown in FIG. 23, the 100.00% for Rule "R1_18%" and Column "TRTPC4" means that 100.00% of R1_18's being triggered happened in TRTPC4. For Row "R3_1914%" and Column "TRTPC1", the 81.82% means that 81.92% of R3_1914's triggered happened in TRTPC1. For Row "R3_249%" and Column "TRTPC4", the 28.91% means that 28.91% of R3_249's triggered happened in TRTPC4.

As shown in FIG. 24, for Row "R1_203" and Column "TRTPC1%", the 7.66% means, R1_203's triggering in TRTPC1 covers 7.66% of TRTPC1 total volume. For Row "R3_1717" and Column "TRTPC6%", the 44.91% means that R3_1717's triggering in TRTPC6 covers 44.91% of TRTPC6 total volume. For Row "R3_612" and Column "TRTPC2%", the 2.57% means that R3_612's triggering in TRTPC2 covers 2.57% of TRTPC2 total volume.

Redundancy analysis can be performed for the TRTPC with an over trigger percent >0.0%. For each TRTPC with an over trigger percent >0.0%, the rules that triggered with a high concentration in that TRTPC can be identified. The rules that triggered with a high concentration in that TRTPC can be identified from, for example, the information in FIG. 23. Further, among the rules that are triggering in a high concentration in one TRTPC, the coverage percentages of the rules for that TRTPC are evaluated if the coverage percentages are high and close to each other. The coverage percentages for TRTPC can be identified from, for example, the information in FIG. 24.

For the rules that have a high coverage percentage and are close to each other, the rules will be evaluated for redundancy.

C. Redundant Rule Subsystem

Figure 25:
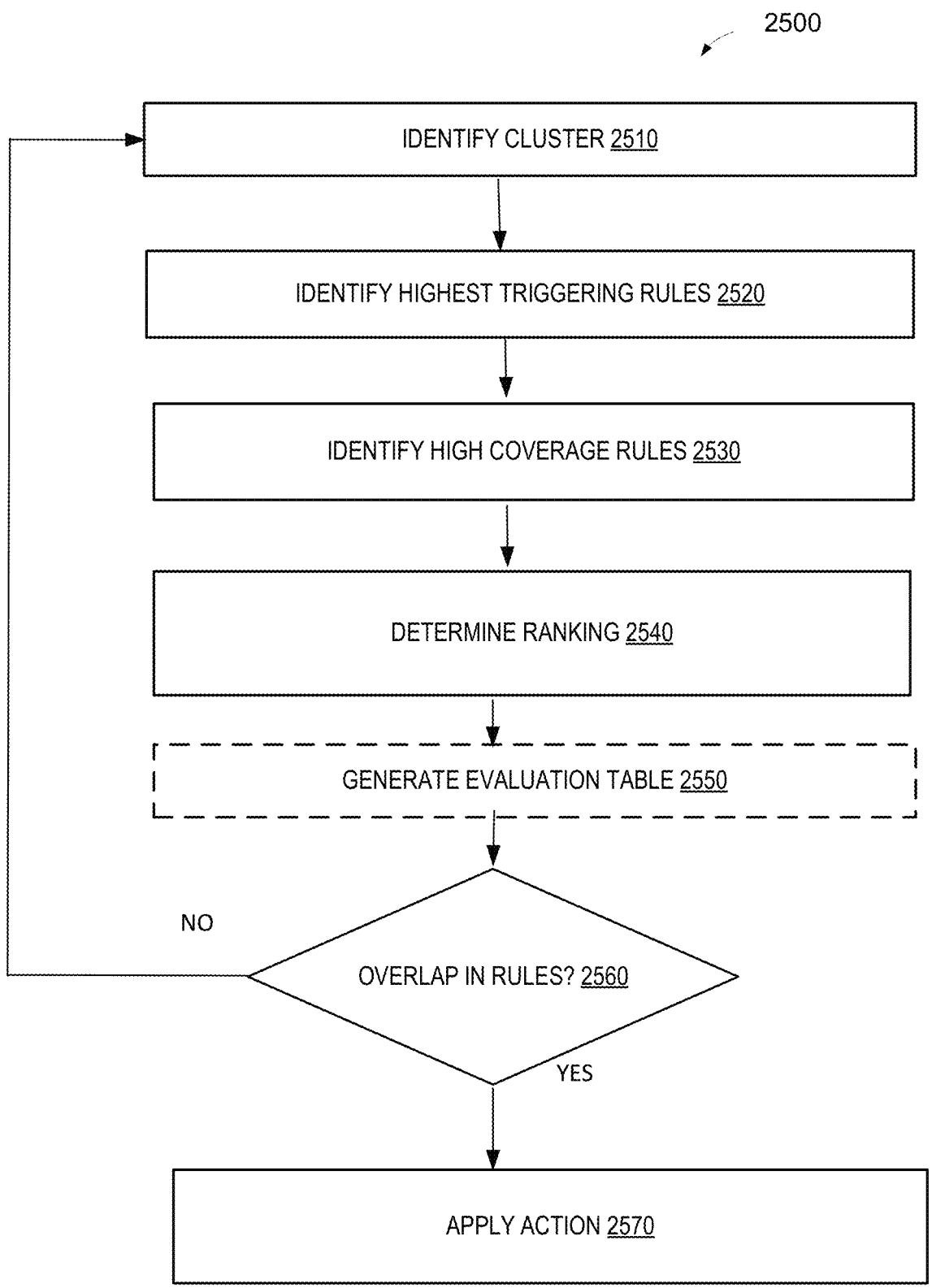
FIG. 25 illustrates a flowchart of a method for identifying redundant rules, in accordance with some example embodiments.
Figure 26:
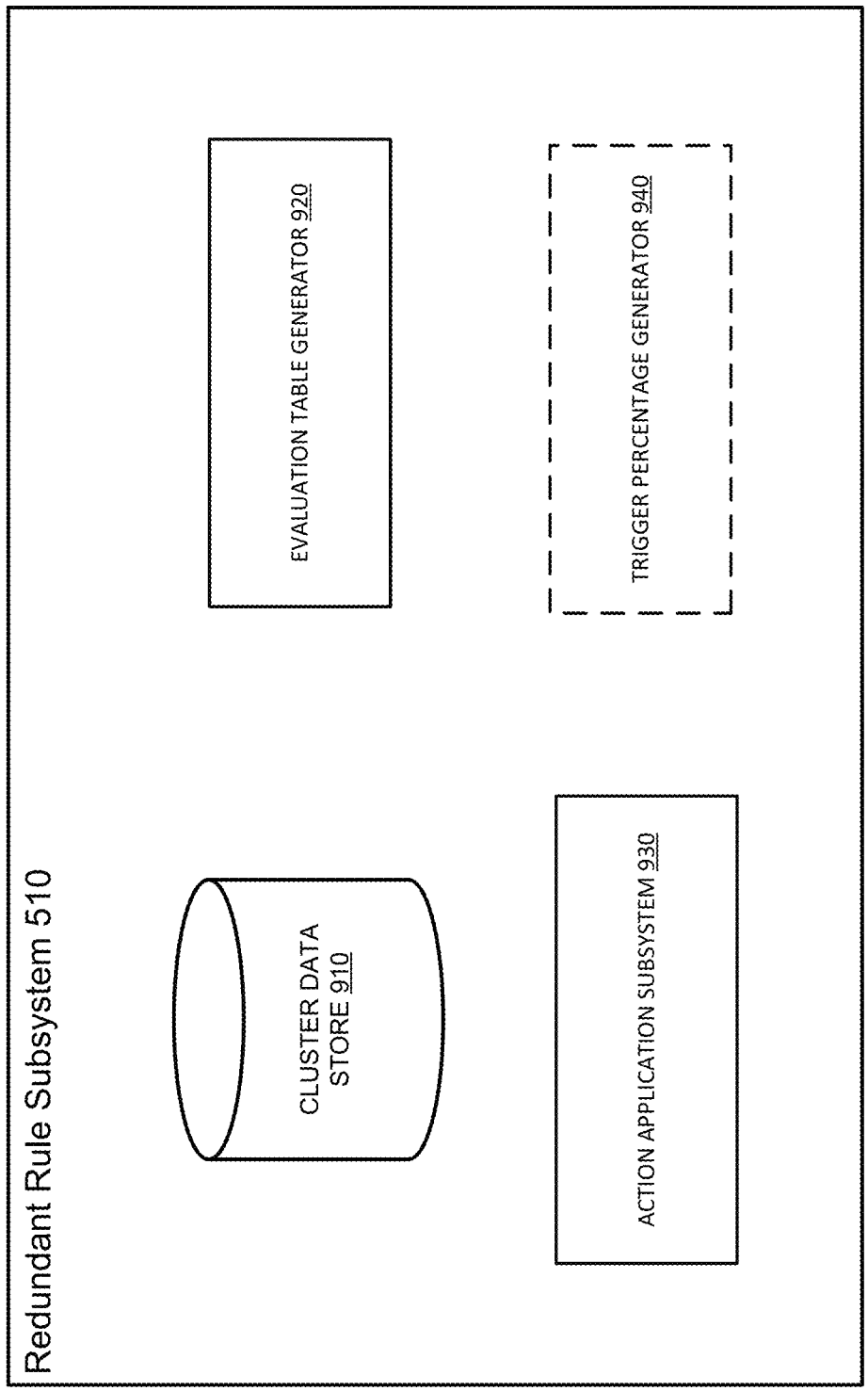
FIG. 26 illustrates a redundant rule subsystem, in accordance with some example embodiments.

FIG. 25 illustrates a flowchart of a method 2500 for identifying redundant rules, in accordance with some example embodiments. FIG. 26 illustrates a redundant rule subsystem 510, in accordance with some example embodiments. Redundant rule subsystem 510 can include cluster data store 910, evaluation table generator 920, action application subsystem 930 and trigger percentage generator 940. When evaluating the redundancy of rules, the rules can enter a passive mode so that the rules can be monitored.

For purposes of example, the Rule Redundancy Reduction Parameters include Max Percent of Rejection Reduction: 2% and Min Number of Rules To Be Removed/Set to Surveillance Mode: 10. The information available can indicate that there are six clusters summarizing the Transaction Rule Triggering Pattern, therefore, there are six TRTPCs. The information available can also include the Rules' Prior/Post Implementation Performance, the Rules' Prior/Post Performance Rank, Nominal Description generated, and the Rule's Overall Performance Rank.

At step 2510, a cluster is identified for evaluation. The first cluster that is identified has the highest triggering percentage. The cluster can be obtained from cluster data store 910. As shown in FIG. 22, six clusters were determined (e.g., TRTPC1, TRTPC2, TRTPC3, TRTPC4 TRTPC5, and TRTPC6). The over trigger percentages are 7.05% for TRTPC1, 9.98% for TRTPC2, 106.67% for TRTPC3, 26.57% for TRTPC4, 22.83% for TRTPC5, and 4.29% for TRTPC6. TRTPC3 is appearing as the most triggered cluster since TRTPC3 has a triggering percent of 106.67. Therefore, TRTPC3 is the most over triggered cluster.

At step 2520, rules having the highest triggering percentage for the first cluster (TRTPC3) are identified. Rules having the highest triggering percentage are rules having a triggering percentage above a predetermined amount (e.g., greater than 50%). For purposes of example, a triggering percentage greater than 50% is used to identify the rules having the highest triggering percentages in a cluster, however, the triggering percentage can be modified based on the needs of the user. The triggering percentages can be generated by trigger percentage generator 940.

As shown in FIG. 23 and Table 2 below, R1_80 and R1_83 both triggered 100% in TRTPC3.

TABLE 2

|  | TRTPC3 |
| --- | --- |
| R1_80% | 100.00% |
| R1_83% | 100.00% |

At step 2530, rules having the highest coverage percentage for the first cluster (TRTPC3) are identified. Rules having the highest coverage percentage are rules having a coverage percentage above a predetermined amount (e.g., greater than 50%). For purposes of example, a coverage percentage greater than 50% is used to identify the rules having the highest coverage percentages in a cluster, however, the coverage percentage can be modified based on the needs of the user.

As shown in FIG. 24 and Table 3 below, R1_80 and R1_83 both would cover 100% for TRTPC3.

TABLE 3

|  | TRTPC3 % |
| --- | --- |
| R1_80 | 100.00% |
| R1_83 | 100.00% |

At step 2540, the ranking of the rules identified in steps 2520 and 2530 are identified. Table 4 below illustrates the overall rank of R1_80 and R1_83.

TABLE 4

|  | Overall_Rank |
| --- | --- |
| R1_83 | 49 |
| R1_80 | 50 |

At step 2550, the combination of trigger percentage data, cover percentage data and overall rank data can be combined and provided in a temporary joint table. The evaluation table can also be known as an intermediate evaluation table or a temporary joint table. The evaluation table can be generated by the evaluation table generator 920. Providing such a table can make it easier for a user to review the information regarding a rule's performance. Table 5 illustrates a combination of R1_80 and R1_83 trigger percentage, cover percentage and overall rank.

TABLE 5

| TRTPC3 | Rule % | TRTPC % | perf rank |
| --- | --- | --- | --- |
| R1_80 | 100.00% | 100.00% | 49 |
| R1_83 | 100.00% | 100.00% | 50 |

In this example, R1_80 and R1_83 where the most highly triggered rules in TRTPC3. Further, their cover percentage is similar. They both have a 100% cover percentage. Also, their performance rank is both in a lower range. The performance rank of a rule is determined based on a rule's performance with respect to the other rules being evaluated.

At step 2560, it is determined whether rules overlap. Determining that rules overlap can be based on the information available in the evaluation table. In the above example, it can be determined that R1_80 and R1_83 overlap. The rules can be determined to overlap if their coverage percentages are high and they are ranked closely to each other. Rules can be determined to be rank close to each other if the rankings are within a predetermined range to each other. The range can vary based on the transactions and rules being analyzed. However, rules can be ranked close to each other if they are within, for example, ten rankings of each other.

At step 2570, an appropriate action can be applied to the rules. In the example described above, R1_80 and R1_83 can be consolidated. In the example shown with respect to TRTPC3, the trigger percentage and the cover percentage for the identified rules are the same. However, in some embodiments the trigger percentage and the cover percentage may not be the same, however, the values may be similar enough to determine that they should be consolidated. The action to be applied can be determined by the action application subsystem 930.

Table 6 below illustrates that actions that can be performed based on the performance criteria of the rules.

TABLE 6

Criterion and Actions to Remove Rules when a pair of rules overlapped.

| Rule_A | Rule_B | Action |
|---|---|---|
| High | High | keep <Rule_A OR Rule_B> |
| High | Moderate | If two rules lightly overlap, keep <Rule_A OR Rule_B> If two rules heavily overlap, evaluate <Rule_B AND NOT Rule_A>, if its performance was Low, remove Rule_B; otherwise keep <Rule_A OR Rule_B> |
| High | Low | Remove the Low performed one |
| Moderate | High | If two rules lightly overlap, keep <Rule_A OR Rule_B> If two rules heavily overlap, evaluate <Rule_A AND NOT Rule_B>, if its performance was Low, remove Rule_A; otherwise keep <Rule_A OR Rule_B> |
| Moderate | Moderate | If two rules lightly overlap, keep <Rule_A OR Rule_B> If two rules heavily overlap, evaluate <Rule_B AND NOT Rule_A>, if its performance was Low, remove Rule_B; otherwise keep <Rule_A OR Rule_B> |
| Moderate | Low | Remove the Low performed one |
| Low | High | Remove the Low performed one |
| Low | Moderate | Remove the Low performed one |
| Low | Low | Remove the Low performed ones, if they overlapped lightly; or add <Rule_A AND Rule_B> if they overlapped heavily. |

In the example table above, "lightly overlap" for rule_a and rule_b, could include, for example, an overlap count that is less than 10% of the union counts for two triggered rules. In the example table above, "highly overlap" for rule_a and rule_b, could include, for example, an overlap count that is more than 50% of the union counts for two triggered rules. However, these are merely examples and the threshold percentages can vary based on the results desired by the user.

The two rules (R1_80 and R1_83) can be consolidated via an "AND" operation. For example, consolidation of the rules can be represented by R1_83 and R1_80=<R1_83 AND R1_80>. The method 2500 can be repeated for all of the clusters being evaluated. Consolidation can be performed for poor performing rules in each of the clusters.

For example, if the method 2500 is repeated for the second most over triggered cluster (e.g., TRTPC4). At step 2510 a cluster is identified for evaluation (e.g., TRTPC4). In the example described above, TRTPC4 is appearing as the second most triggered cluster. As shown in FIG. 22, TRTPC4 has a triggering percent of 26.57%. Therefore, TRTPC4 has the second highest triggering percentage of the six clusters.

At steps 2520 and 2530, rules having the highest triggering percentage for the cluster and highest coverage percentage for the cluster (e.g., TRTPC4) are identified. In this example, the highest triggering and highest coverage rules for cluster TRTPC4 are R1_18, R3_1115, R3_250 and R3_253.

At step 2550, a temporary joint table can be formed and the ranks of the highest triggering and highest covering rules in the cluster (TRTPC4) are provided in the table. The temporary joint table for cluster TRTPC4 is shown below in Table 7.

TABLE 7

| TRTPC4 | Rule % | TRTPC % | perf rank |
|---|---|---|---|
| R1_18 | 100.0000% | 100.0000% | 37 |
| R3_1115 | 61.9048% | 0.8508% | 40 |
| R3_250 | 58.3333% | 0.4581% | 43 |
| R3_253 | 50.0000% | 0.0654% | 61 |

Rule R1_18 has a high coverage for this TRTPC4. The rest of the identified rules have minor coverage of TRTPC4 indicating that their overlapping probability will tend to be low. In addition, performance of rule R3_250 and rule R3_1115 lands in the moderate level. Therefore, a consolidating rule can be created via pairing. The two rules can be consolidated via an "OR" operation. For example, consolidation of the rules can be represented by R3_250 or R3_1115=<R3_250 or R3_1115>. In the example shown for TRTPC4, rule R3_253 is a poor performing rule.

The method is then performed for the third highest over triggered cluster, fourth highest over triggered cluster, fifth highest over triggered cluster, etc. In an example embodiment, all of the clusters can be evaluated or some of the clusters may be evaluated based on the end results that are being obtained. For example, if there is are low triggering and covering percentages in a cluster, or if rules are high performing rules in a cluster, then there may not be a need to evaluate any clusters subsequent (e.g., clusters having a lower triggering percentage) to the cluster being evaluated.

If the third over triggered cluster (e.g., TRTPC5) is to be evaluated, the temporary joint table for cluster TRTPC5 can look like that shown in Table 8.

TABLE 8

| | TRTPC5 | | |
|---|---|---|---|
| TRTPC5 | Rule % | TRTPC % | perf rank |
| R1_43 | 100.00% | 100.00% | 30 |

As shown in Table 8, only rule R1_43 was the most highly triggered rule in TRTPC5. Further, R1_43 has the highest cover percentage. Therefore, there is no overlap with trigger rate or cover percentage with another rule in TRTPC5. Therefore, no consolidation will be performed for TRTPC5. Further, rule R1_43 is performing at moderate level and therefore, is not a likely candidate for removing or monitoring.

If the fourth over triggered cluster (e.g., TRTPC2) is to be evaluated, the temporary joint table for cluster TRTPC2 can look like that shown in Table 9.

TABLE 9

| | TRTPC2 | | |
|---|---|---|---|
| TRTPC2 | Rule % | TRTPC % | perf rank |
| R1_52 | 100.00% | 100.00% | 52 |

The results for TRTPC2 are similar to those that were obtained in TRTPC5. Only rule R1_52 is the most highly triggered rule in TRTPC2. Further, R1_52 has the highest cover percentage. Therefore, there is no overlap with trigger rate or cover percentage with another rule in TRTPC2. Therefore, no consolidation will be performed for TRTPC2. However, rule R1_52 is performing at a low level and, therefore, is a likely candidate for removing or monitoring.

If the fifth over triggered cluster (e.g., TRTPC1) is to be evaluated, the temporary joint table for cluster TRTPC2 can look like that shown in Table 10.

TABLE 10

| TRTPC1 | Rule % | TRTPC % | perf rank |
|---|---|---|---|
| R3_402 | 100.00% | 0.04% | 1 |
| R3_264 | 100.00% | 0.02% | 2 |
| R3_630 | 86.71% | 1.39% | 4 |
| R3_1847 | 100.00% | 0.03% | 5 |
| R3_659 | 81.03% | 2.03% | 6 |
| R3_643 | 75.67% | 7.59% | 7 |
| R3_1830 | 100.00% | 0.37% | 8 |
| R3_1617 | 100.00% | 27.47% | 10 |
| R3_613 | 97.41% | 0.58% | 11 |
| R3_658 | 90.37% | 0.84% | 12 |
| R3_1342 | 94.38% | 0.98% | 13 |
| R3_885 | 96.77% | 1.85% | 14 |
| R3_1107 | 100.00% | 0.48% | 15 |
| R3_1110 | 95.09% | 1.19% | 16 |
| R3_1335 | 100.00% | 0.15% | 17 |
| R3_628 | 93.96% | 1.11% | 18 |
| R3_666 | 93.89% | 2.13% | 19 |
| R3_1914 | 81.82% | 0.03% | 20 |
| R3_1670 | 99.84% | 1.92% | 21 |
| R3_646 | 86.24% | 1.61% | 22 |
| R3_1607 | 96.01% | 1.19% | 23 |
| R3_182 | 100.00% | 0.03% | 25 |
| R3_1597 | 95.47% | 3.45% | 26 |
| R3_1581 | 99.72% | 3.31% | 27 |
| R3_449 | 100.00% | 0.07% | 28 |
| R1_203 | 100.00% | 7.66% | 29 |
| R3_450 | 100.00% | 0.75% | 31 |
| R3_249 | 71.09% | 0.28% | 34 |
| R3_612 | 93.36% | 14.38% | 36 |
| R1_42 | 99.67% | 0.92% | 39 |
| R3_252 | 72.73% | 0.02% | 44 |
| R3_414 | 100.00% | 0.90% | 47 |
| R1_9 | 100.00% | 21.48% | 53 |
| R1_68 | 100.00% | 0.03% | 55 |
| R3_401 | 100.00% | 0.08% | 56 |
| R1_66 | 100.00% | 0.06% | 59 |
| R3_616 | 100.00% | 0.11% | 63 |
| R1_72 | 100.00% | 0.10% | 64 |
| R3_1873 | 100.00% | 0.14% | 69 |
| R3_393 | 100.00% | 0.12% | 70 |

The rules shown in Table 10 either have a high trigger percentage or have a high coverage percentage. Rules R3_1617 and R3_612 can be identified as rules having a high trigger percentage. With respect to rule pair R3_1617 and R3_612, R3_1617 has a high performance and R3_612 has a moderate performance. Further, coverage percentage are 27.47% and 14.38%, respectively. Therefore, their overlap probability would be low.

Therefore, in this instance, the new rule <R3_612-R3_1617> can be evaluated during their post implementation period. This evaluation can be performed automatically by the decision manager replay engine. The set <R3_612-R3_1617> can be run during a post implementation time interval. The rule performance metrics can be collected and the rule can be ranked. Performance of this new rule <R3_612-R3_1617> can be ranked among existing rules. If the performance of <R3_612-R3_1617> lands in a low performance level, then this new rule can possibly be removed. R3_1617 (which is high performing) can be ranked higher than R3_612 (which is moderate performing).

If rule <R3_612-R3_1617> performance on the post implementation period is ranked lower than R3_612, then R3_612 can be removed, according to the actions in Table 6. Further, if R3_612 OR R3_1617 do not overlap, then R3_612 and R3_1617 can be consolidated.

The pair of rules R3_643 and R1_203 falls in one high performance, one moderate performance, and their coverage percentage are 7.59% and 7.66%, respectively. Their overlap probability would be low. Therefore, in this instance, evaluate a new rule <R1_203-R3_643>, on their post implementation period. Rank the performance of the new rule <R1_203-R3_643>, among existing rules. If the performance of <R1_203-R3_643> lands in the low performance level, then the rule R1_203 may be removed. If the performance was in moderate and high level, the rules can be consolidated via an "OR" operation. If the results show the rules do not overlap, then the rules can be consolidated <R1_203 OR R3_643>.

The pair of rules R3_1597 and R3_1581 fall in two moderate performance, and their coverage percentage are 3.45% and 3.31%, respectively. Their overlap probability would be low. Therefore, in this instance, evaluate a new rule <R3_1581-R3_1597>, on their post implementation period. Rank the performance of the new rule <R3_1581-R3_1597>, among existing rules. If the performance of <R3_1581-R3_1597> landed in the low performance level, consider removing the rule R3_1581. If the performance was in moderate and high level, consolidate the rules via "OR" operation. The results showing they do not overlap, consolidate the two via <R3_1581 OR R3_1597>. The rules are paired if their performance levels are similar, their coverage percentage for this cluster are low and similar. Therefore, in this example, there is R3_1110 or R3_628=<R3_1110 OR R3_628> and R3_666 or R3_1670=<R3_666 OR R3_1670>. The low performing rules in this example include R3_393, R3_1873, R1_72, R3_616, R1_66, R3_401, R1_68, R1_9, etc.

FIG. 27 illustrates a table 2700 including intermediate impact evaluation of rule janitor action, in accordance with some example embodiments. FIG. 27 illustrates an intermediate evaluation table. The table in FIG. 27 includes consolidated rules, select candidate of removal rules, and select candidate set to monitor mode rules.

V. Report Generation

FIG. 28 illustrates a table 2800 comprising rule janitor output information, in accordance with some example embodiments. In the example table shown in FIG. 28, the parameter settings were Max Percent of Rejection Reduction: 2% and Min Number of Rules To Be Removed/Set to Surveillance Mode: 10. As shown in FIG. 28, 7 consolidation rules are to be added. 14 rules will be removed because of consolidation. 22 rules will be removed for low performed. 3 rules will be set to surveillance mode, since they did not trigger and have moderate performance. The rejection impact is 0.16%, less than the max allowance of 2%.

The table shown in FIG. 28 can be displayed on a user interface. The Rule Janitor output table, can include Rule ID (Consolidation logic readable), a Rule Janitor Recommendation, Prior Implementation Performance description, Post Implementation Performance description and Impact on total rejection rate, if a recommendation is followed. This table can be provided to a resource provider to assist a resource provider in determining how to handle the rules in their system.

The recommendations can be generated automatically without requiring user intervention. The janitor computer can independently determine whether rules are redundant and what actions should be performed for the rules. The recommendations can be provided to a user via a report.

The table shown in FIG. 28 can be an interactive table. For example, the user can select on fields in the table to obtain additional information. For example, the user can select values in the fields to determine how the value was obtained.

An example embodiment can provide an automated system for identifying redundant rules. Further, example embodiments do not affect the operation of the system. Therefore, example embodiments can be performed without affecting transactions that are being performed.

VI. Access Server

Figure 29:
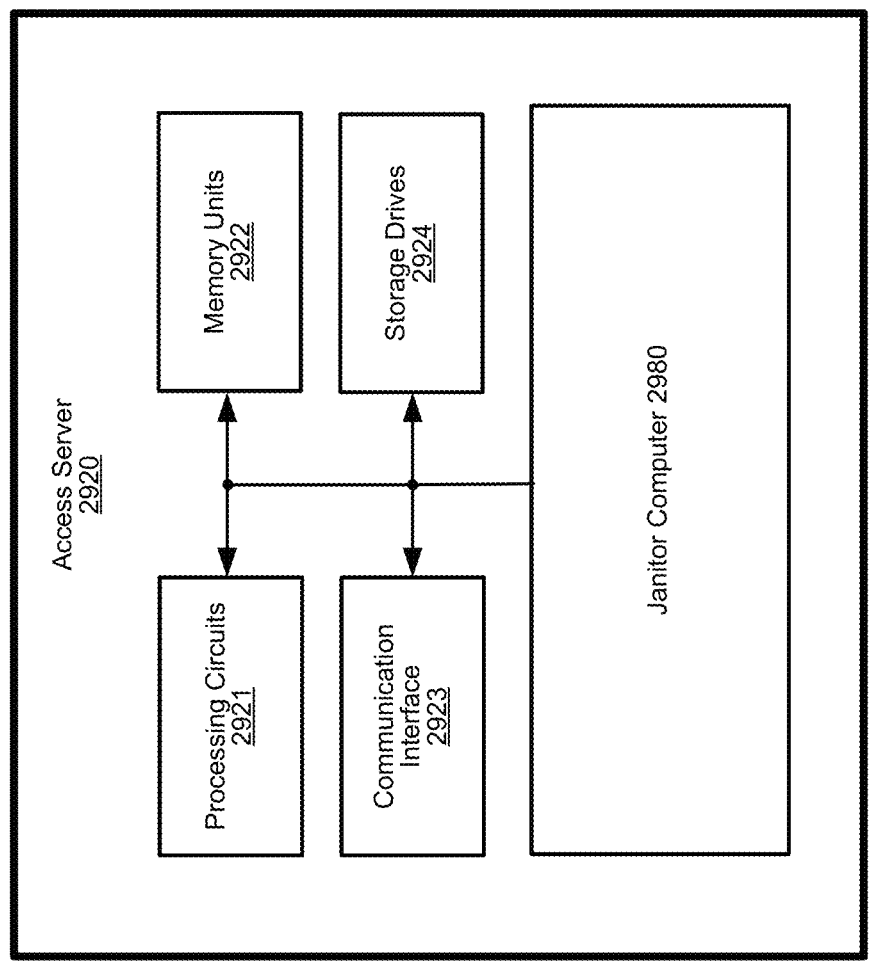
FIG. 29 shows a functional block diagram of components of an exemplary computer system including an access server, in accordance with some embodiments.

FIG. 29 shows a functional block diagram of components of an exemplary computer system including an access server 2920, in accordance with some embodiments. The various components may be embodied by computer hardware or computer code stored on a non-transitory computer readable storage medium.

The access server 2920 may comprise one or more processor circuits 2921. The processor circuits 2921 may execute instructions to perform the functions of the access servers described herein (e.g., operating access rules to accept, reject, or review access requests). The processor circuits 2921 may be coupled to one or more memory units 2922 that are configured to store data and instructions. The memory units 2922 may be non-transitory computer-readable storage medium. The processor circuits 2921 may read data from the memory units 2922 and write data to the memory units 2922. For example, the processor circuits 2921 may load into the memory units 2922 a plurality of access request rules and parameters of an access request in order to determine an access request outcome, as described herein.

The access server 2920 may also comprise a communication interface 2923. The communication interface 2923 may receive communications from a communication interface of another computer, such as communications from a resource computer or an access server. The communication interface 2923 of the access server 2920 may communicate with the communication interface 2923 of the access rule generation system 2930. The communication interface 2923 may also transmit communications to another computer. The access server 2920 may receive access request information and access request parameters via the communication interface 2923.

The access server 2920 may also comprise one or more storage drives 2924. The storage drives 2924 may be directly coupled to the access server 2920 or they may be network accessible storage drives 2924. The storage drives 2924 may comprise one or more databases for storing the access request information and the access request parameters. The storage drives 2924 may store data that may be loaded into the memory units 2932 by the processor circuits 2921.

The access server 2920 can also include janitor computer 2980. The janitor computer 2980 can correspond to janitor computer 180 described with respect to FIG. 2 above.

VII. Computer System

Figure 30:
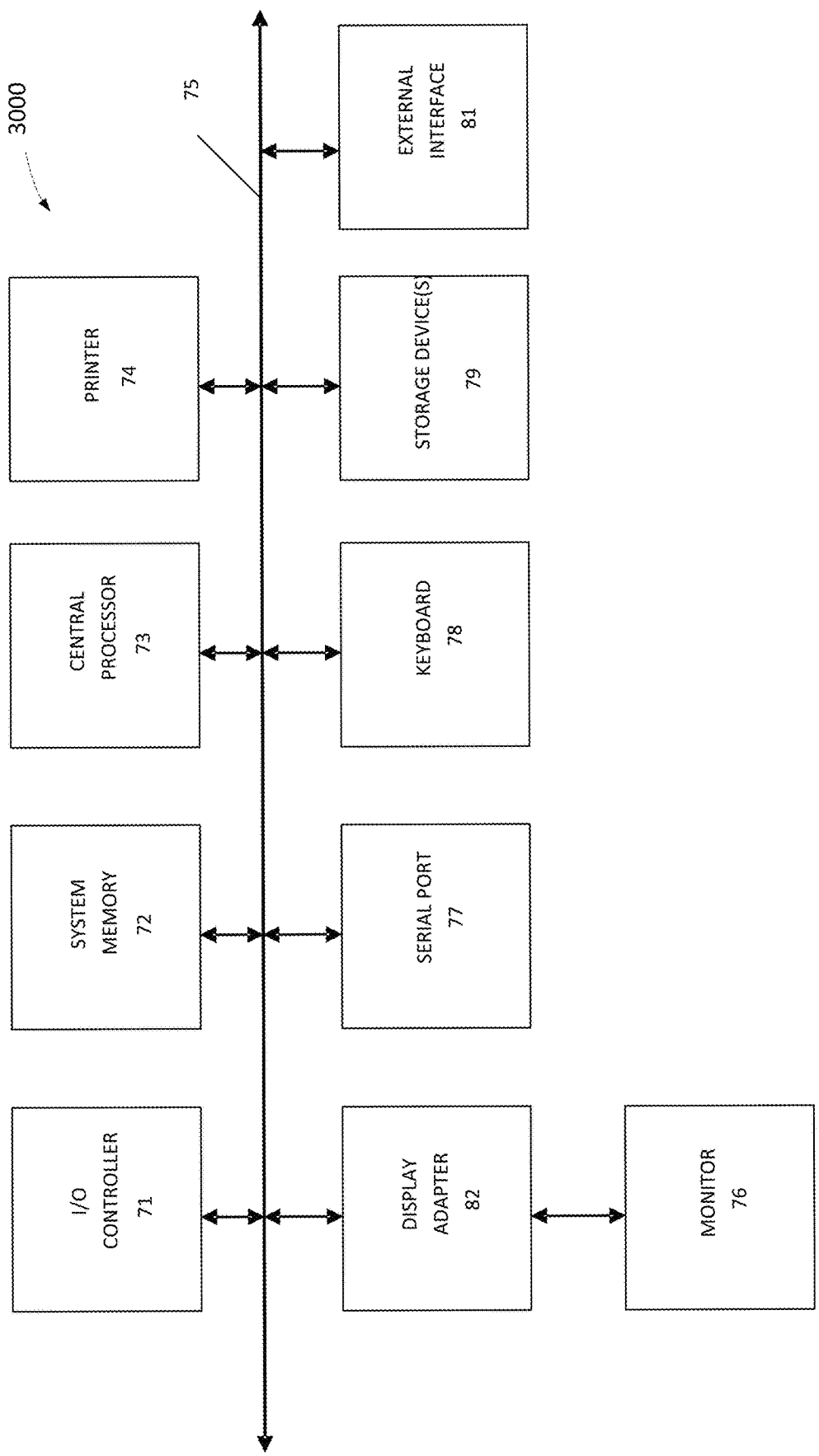
FIG. 30 is a high level block diagram of a computer system that may be used to implement any of the entities or components described above.

FIG. 30 is a high level block diagram of a computer system 3000 that may be used to implement any of the entities or components described above. The computer system 3000 can be included in a request processing system.

The subsystems shown in FIG. 30 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g., Ethernet, Wi-Fi, etc.) can be used to connect computer system 3000 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

It should be understood that any of the embodiments can be implemented in the form of control logic using hardware (e.g., an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the disclosure. However, other embodiments may be directed to specific embodiments relating to each individual aspect, or specific combinations of these individual aspects.

For the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for managing redundant access rules performed by a server computer comprising a processor and a memory, the method comprising:
   determining, by the server computer, a first cluster from a plurality of clusters of access requests having a first trigger percentage, wherein the first cluster comprises a first subset of access rules of a first plurality of access rules;
   identifying, by the server computer, a first access rule in the first subset of access rules having a trigger percentage above a predetermined threshold;
   identifying, by the server computer, a second access rule in the first subset of access rules having the trigger percentage above the predetermined threshold;
   determining, by the server computer, whether the first access rule and the second access rule of the first subset of access rules in the first cluster are redundant based on a performance rank of the first access rule and a performance rank of the second access rule;
   in response to determining that the first access rule and the second access rule of are redundant applying, by the server computer, an action to the first access rule and the second access rule;
   evaluating, by the server computer, an impact of the action applied to the first access rule and the second access rule; and
   providing, by the server computer, a recommendation regarding the first access rule or the second access rule based on the evaluation.

2. The method according to claim 1, wherein evaluating the impact of the action applied to the first access rule and the second access rule comprises:
   temporarily consolidating the first access rule and the second access rule; and
   determining an access request rejection rate based on the temporarily consolidated first access rule and the temporarily consolidated second access rule.

3. The method according to claim 2, wherein evaluating the impact of the action applied to the first access rule and the second access rule further comprises:
   determining rule reduction parameters; and
   determining whether the access request rejection rate based on the temporarily consolidated first access rule and the temporarily consolidated second access rule satisfies the rule reduction parameters.

4. The method according to claim 3, wherein in response to determining that the access request rejection rate does not satisfy the rule reduction parameters, adjusting, automatically by the server computer, clustering parameters for clustering the access requests.

5. The method according to claim 3, wherein a clustering parameter comprises a number of clusters to be generated.

6. The method according to claim 1, wherein the determining whether the first access rule and the second access rule of the first subset of access rules in the first cluster are redundant comprises:
   determining whether a first performance rank of the first access rule and a second performance rank of the second access rule are within a predetermined range to each other; and
   in response to determining that the first performance rank of the first access rule and the second performance rank of the second access rule are within the predetermined range to each other, identifying the first access rule and the second access rule as redundant rules.

7. The method according to claim 1, wherein determining the performance rank for the first access rule comprises:
   determining a pre-implementation performance rank for the first access rule; and
   determining a post-implementation performance rank for the first access rule.

8. The method according to claim 1, wherein the performance rank is a numerical value representing a ranking of an access rule in relation to other access rules in the first subset of access rules.

9. The method according to claim 1, further comprising, prior to determining the first cluster from the plurality of clusters, performing cluster modeling to determine a co-triggering pattern of access rules associated with the access requests.

10. The method according to claim 1, wherein the first trigger percentage is greater than 50%.

11. The method according to claim 1, wherein the first cluster has a highest coverage triggering percentage from among the plurality of clusters.

12. The method according to claim 1, wherein the recommendation comprises at one of consolidating the first access rule and the second access rule, removing at least one of the first access rule and the second access rule, or monitoring the first access rule and the second access rule.

13. The method according to claim 1, wherein in response to the performance rank of the first access rule and the second access rule being within a predetermined range of each other, consolidating the first access rule and the second access rule.

14. The method according to claim 1, wherein the recommendation comprises a report that is displayed on an interactive user interface.

15. The method according to claim 1, wherein the action comprises removing the first access rule or removing the second access rule.

16. A server computer comprising:
a processor;
a memory;
a computer readable medium coupled to the processor, the computer readable medium storing instructions executable by the processor for implementing a method for managing redundant access rules comprising:
  determining a first cluster from a plurality of clusters of access requests having a first trigger percentage, wherein the first cluster comprises a first subset of access rules of a first plurality of access rules;
  identifying a first access rule in the first subset of access rules having a trigger percentage above a predetermined threshold;
  identifying a second access rule in the first subset of access rules having the trigger percentage above the predetermined threshold;
  determining whether the first access rule and the second access rule of the first subset of access rules in the first cluster are redundant based on a performance rank of the first access rule and a performance rank of the second access rule;
  in response to determining that the first access rule and the second access rule of are redundant applying an action to the first access rule and the second access rule;
  evaluating an impact of the action applied to the first access rule and the second access rule; and
  providing a recommendation regarding the first access rule or the second access rule based on the evaluation.

17. The server computer according to claim 16, wherein the determining whether the first access rule and the second access rule of the first subset of access rules in the first cluster are redundant comprises:
  determining whether a first performance rank of the first access rule and a second performance rank of the second access rule are within a predetermined range to each other; and
  in response to determining that the first performance rank of the first access rule and the second performance rank of the second access rule are within the predetermined range to each other, identifying the first access rule and the second access rule as redundant rules.

18. The server computer according to claim 16, wherein evaluating the impact of the action applied to the first access rule and the second access rule comprises:
  temporarily consolidating the first access rule and the second access rule; and
  determining an access request rejection rate based on the temporarily consolidated first access rule and the temporarily consolidated second access rule.

19. A system for managing redundant access rules, the system comprising:
a server computer, comprising a processor and a memory, configured to:
  determine a first cluster from a plurality of clusters of access requests having a first trigger percentage, wherein the first cluster comprises a first subset of access rules of a first plurality of access rules;
  identify a first access rule in the first subset of access rules having a trigger percentage above a predetermined threshold;
  identify a second access rule in the first subset of access rules having the trigger percentage above the predetermined threshold,
  determine whether the first access rule and the second access rule of the first subset of access rules in the first cluster are redundant based on a performance rank of the first access rule and a performance rank of the second access rule;
  in response to determining that the first access rule and the second access rule of are redundant apply an action to the first access rule and the second access rule;
  evaluate an impact of the action applied to the first access rule and the second access rule; and
  provide a recommendation regarding the first access rule or the second access rule based on the evaluation.

20. The system according to claim 19, wherein the determining whether the first access rule and the second access rule of the first subset of access rules in the first cluster are redundant comprises:
  determining whether a first performance rank of the first access rule and a second performance rank of the second access rule are within a predetermined range to each other; and
  in response to determining that the first performance rank of the first access rule and the second performance rank of the second access rule are within the predetermined range to each other, identifying the first access rule and the second access rule as redundant rules.

* * * * *